United States Patent
Hall et al.

(10) Patent No.: US 11,012,727 B2
(45) Date of Patent: *May 18, 2021

(54) PREDICTIVE CONTENT DELIVERY FOR VIDEO STREAMING SERVICES

(71) Applicant: Comcast Cable Communications, LLC, Philadelphia, PA (US)

(72) Inventors: Jeffrey Allen Hall, Aurora, CO (US); Federico Buratti, Centennial, CO (US); Justin Thompson, Frederick, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/450,333

(22) Filed: Jun. 24, 2019

(65) Prior Publication Data

US 2020/0053404 A1 Feb. 13, 2020

Related U.S. Application Data

(63) Continuation of application No. 15/852,715, filed on Dec. 22, 2017, now Pat. No. 10,390,063.

(51) Int. Cl.
| | | |
|---|---|---|
| H04N 21/20 | (2011.01) | |
| H04N 21/25 | (2011.01) | |
| H04N 21/466 | (2011.01) | |
| H04N 21/4725 | (2011.01) | |
| H04N 21/41 | (2011.01) | |
| H04N 21/442 | (2011.01) | |
| H04N 21/81 | (2011.01) | |
| H04N 13/117 | (2018.01) | |
| H04N 13/194 | (2018.01) | |
| H04N 5/232 | (2006.01) | |

(52) U.S. Cl.
CPC ....... *H04N 21/251* (2013.01); *H04N 5/23238* (2013.01); *H04N 13/117* (2018.05); *H04N 13/194* (2018.05); *H04N 21/4126* (2013.01); *H04N 21/44218* (2013.01); *H04N 21/4667* (2013.01); *H04N 21/4725* (2013.01); *H04N 21/816* (2013.01)

(58) Field of Classification Search
None
See application file for complete search history.

(56) References Cited

U.S. PATENT DOCUMENTS

| | | |
|---|---|---|
| 7,613,344 B2 | 11/2009 | Kim et al. |
| 8,903,568 B1 | 12/2014 | Wang et al. |
| 9,219,860 B1 | 12/2015 | Kozko |
| 9,232,257 B2 | 1/2016 | Gautier et al. |
| 9,332,285 B1 * | 5/2016 | Grant ............... H04N 21/47205 |
| 9,720,497 B2 | 8/2017 | Jang et al. |
| 9,912,930 B2 | 3/2018 | Zustak et al. |
| 9,992,449 B1 | 6/2018 | Ashkenazi et al. |
| 10,062,414 B1 | 8/2018 | Westphal |
| 10,178,414 B2 | 1/2019 | Bhogal et al. |
| 10,484,701 B1 | 11/2019 | Wang et al. |

(Continued)

*Primary Examiner* — Cai Y Chen
(74) *Attorney, Agent, or Firm* — Banner & Witcoff, Ltd.

(57) ABSTRACT

Methods, systems, and apparatuses for predicting a user field-of-view change and determining transmission regions of immersive video (IV) content for an IV device are presented. A field-of-view change of a user device may be predicted. A transmission region in one or more video frames of the IV content may be determined based on the predicted change.

24 Claims, 16 Drawing Sheets

(56) References Cited

U.S. PATENT DOCUMENTS

| | | |
|---|---|---|
| 2004/0010803 A1 | 1/2004 | Berstis |
| 2005/0243054 A1 | 11/2005 | Beymer et al. |
| 2008/0036875 A1 | 2/2008 | Jones et al. |
| 2009/0300692 A1 | 12/2009 | Mavlankar et al. |
| 2013/0044996 A1 | 2/2013 | Bhogal et al. |
| 2013/0050183 A1 | 2/2013 | Wang |
| 2014/0211681 A1 | 7/2014 | Chan et al. |
| 2014/0321378 A1 | 10/2014 | Zhang et al. |
| 2015/0016504 A1 | 1/2015 | Auyeung et al. |
| 2015/0254870 A1 | 9/2015 | Knibbe et al. |
| 2015/0346832 A1 | 12/2015 | Cole et al. |
| 2016/0012855 A1 | 1/2016 | Krishnan |
| 2016/0165309 A1 | 6/2016 | Van Brandenburg et al. |
| 2016/0217760 A1 | 7/2016 | Chu et al. |
| 2016/0219267 A1 | 7/2016 | Chu et al. |
| 2016/0219325 A1 | 7/2016 | Chu et al. |
| 2016/0238841 A1 | 8/2016 | LaValle et al. |
| 2016/0261381 A1 | 9/2016 | Ko et al. |
| 2016/0277772 A1* | 9/2016 | Campbell ............. H04N 21/47 |
| 2016/0297522 A1 | 10/2016 | Brulez et al. |
| 2017/0003764 A1 | 1/2017 | Li |
| 2017/0018121 A1 | 1/2017 | Lawson et al. |
| 2017/0075416 A1 | 3/2017 | Armstrong |
| 2017/0085917 A1 | 3/2017 | Hannuksela |
| 2017/0115488 A1 | 4/2017 | Ambrus et al. |
| 2017/0118540 A1 | 4/2017 | Thomas et al. |
| 2017/0150230 A1 | 5/2017 | Shimura et al. |
| 2017/0251176 A1 | 8/2017 | Smolyanskiy et al. |
| 2017/0251204 A1 | 8/2017 | Gupte et al. |
| 2017/0287220 A1 | 10/2017 | Khalid et al. |
| 2017/0310945 A1 | 10/2017 | Juang et al. |
| 2017/0316607 A1 | 11/2017 | Khalid et al. |
| 2017/0339415 A1 | 11/2017 | Wang et al. |
| 2017/0347084 A1 | 11/2017 | Boyce |
| 2017/0359586 A1 | 12/2017 | Xue et al. |
| 2017/0359596 A1 | 12/2017 | Kim et al. |
| 2018/0047332 A1 | 2/2018 | Kuwahara et al. |
| 2018/0061454 A1 | 3/2018 | Herberger et al. |
| 2018/0098077 A1 | 4/2018 | Skupin et al. |
| 2018/0115806 A1 | 4/2018 | Hwang et al. |
| 2018/0181119 A1 | 6/2018 | Lee et al. |
| 2018/0192001 A1 | 7/2018 | Boyce |
| 2018/0213202 A1 | 7/2018 | Kopeinigg et al. |
| 2018/0295400 A1 | 10/2018 | Thomas et al. |
| 2018/0302591 A1 | 10/2018 | Pio et al. |
| 2018/0309955 A1 | 10/2018 | Lawrence |
| 2018/0310010 A1 | 10/2018 | Hourunranta et al. |
| 2018/0364803 A1 | 12/2018 | Khalid et al. |

* cited by examiner

PREDICTIVE CONTENT DELIVERY FOR VIDEO STREAMING SERVICES

CROSS REFERENCE TO RELATED APPLICATION

This application is a continuation of U.S. patent application Ser. No. 15/852,715, filed on Dec. 22, 2017, now U.S. Pat. No. 10,390,063, which is incorporated by reference in its entirety.

BACKGROUND

Providers of content may support numerous types of devices and transmit large amounts of data. Different types of devices may be used to view content, and some video content, such as 360-degree video, virtual reality content, etc., may have more image content than traditional television video. For example, omnidirectional cameras may capture a panoramic 360-degree video, which may include views in a variety of different directions. During playback, the user may view one portion of the panorama and move the view to look in a different direction. Transmitting and processing content, such as a 360-degree video, may require a substantial amount of bandwidth and data processing power.

SUMMARY

The following summary is for illustrative purposes only, and is not intended to limit or constrain the detailed description.

Methods, systems, and apparatuses described herein relate to delivering video content (e.g., an immersive video, such as a 360-degree video) in which a source video has more image content than will be displayed on a display device at one time. A user's field of view (FOV) might encompass just a subset portion of a frame of the image content, and portions of the video that are outside of the FOV may be omitted from a transmission to the user's display device, thereby saving transmission and/or processing resources.

Surrounding portions of the video frame, outside of the FOV, might still be included in a transmission on a predictive basis. Accordingly, if the user adjusts the FOV (e.g., turns his/her head slightly while viewing the video on a head-worn immersive display device), the viewing experience may remain smooth because the surrounding portions were included in the transmission. The surrounding portions may be predictively identified based on a variety of factors, such as movement of the FOV and/or content of the video.

The summary here is not an exhaustive listing of the novel features disclosed herein, and is not limiting of any claims. The above and other features are described in greater detail below.

BRIEF DESCRIPTION OF THE DRAWINGS

The present disclosure is explained by way of examples shown in, and is not limited by, the accompanying figures in which like reference numerals indicate similar elements and in which.

DETAILED DESCRIPTION

Figure 1:
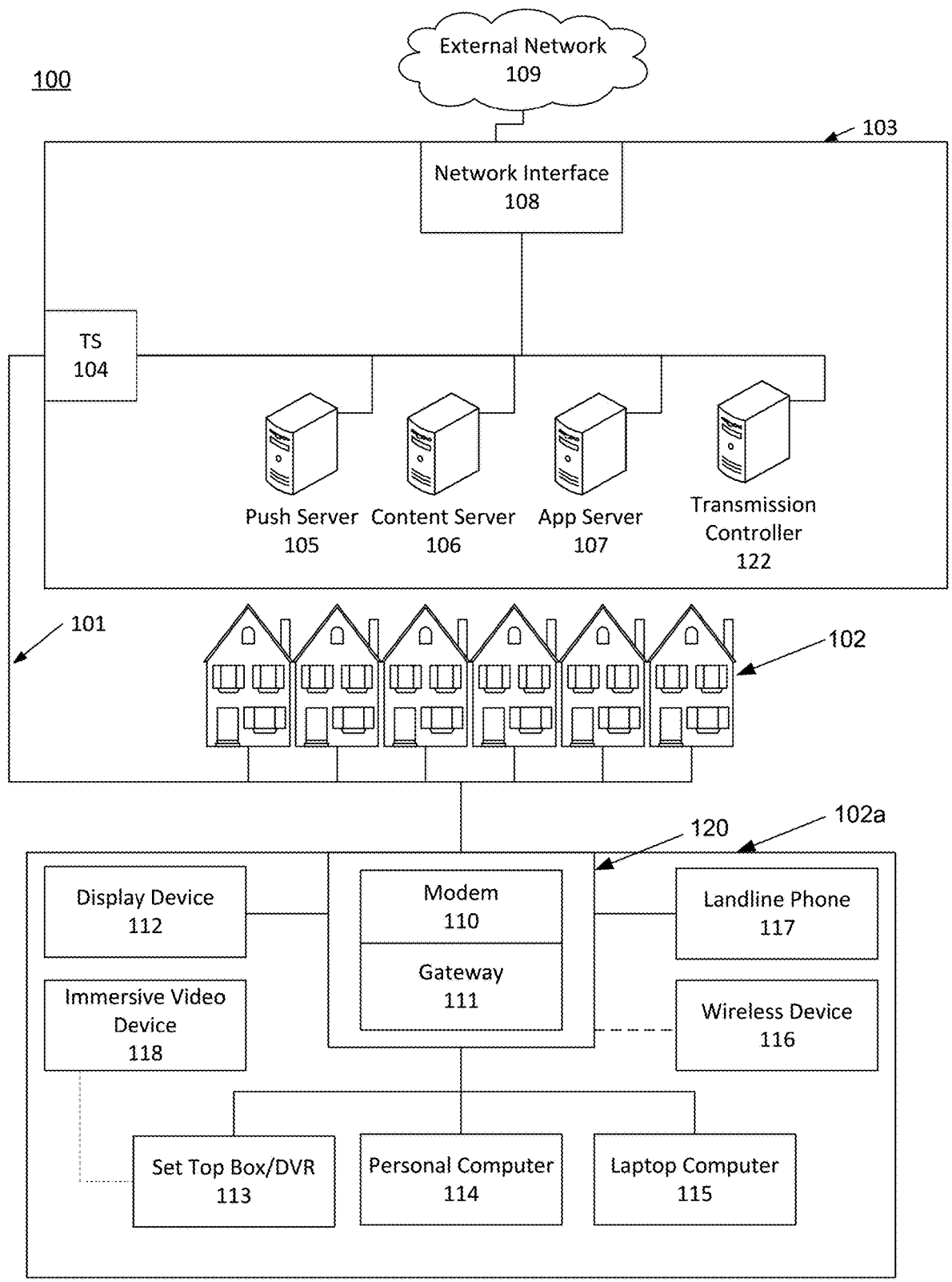
FIG. 1 shows an example communication network.

In the following description, reference is made to the accompanying drawings identified above, which form a part hereof, and in which various examples are shown. Other examples may be utilized and structural and functional modifications may be made, without departing from the scope disclosed herein. Features of examples described herein and in the drawings, and/or from other examples, may be combined and/or features may be omitted.

FIG. 1 shows an example communication network 100 on which features described herein may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not shown, such as splitters, filters, amplifiers, etc. to help convey the signal clearly, but in general, each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premise 102a, such as a home, may include an interface 120. The interface 120 may include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a to communicate with the local office 103 and other devices beyond the local office 103. The gateway 111 may be a set-top box (STB), digital video recorder (DVR), a digital transport adapter (DTA), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g., Voice over Internet Protocol—VoIP phones), Immersive video devices 118, wireless laptops, notebooks, tablets and netbooks, cordless phones (e.g., Digital Enhanced Cordless Telephone—DECT phones), mobile phones, mobile televisions, personal digital assistants (PDA), etc.), any other desired devices, and combinations thereof. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Immersive video devices 118 (IV devices) include devices that provide FOV changing functionalities while viewing or consuming media content. Examples of IV devices 118 may include head-mounted display devices, Virtual Reality (VR) devices, stereoscopic goggles, other wearable wireless communication devices (e.g., smart watches, smart glasses, hand-wearable devices, foot-wearable devices, desktop computers, laptop computers, handheld computers, mobile telephones (e.g., smartphones), etc. The IV devices 118 may be additionally equipped with other wireless communication modules, such as a mobile communication modem that enables a mobile communication with a cellular network. As media playback devices (e.g., cell phones, tablets, computers, in-vehicle entertainment systems, virtual reality display devices) become more prevalent, there are many different devices by which users may want to play and/or obtain content (e.g., video, music, etc.). VR devices, such as a head-mounted display device (e.g., Oculus Rift®), may create VR environments by providing users with various FOV changes. Users of the IV devices 118 may change their FOV in real-time while viewing immersive video. IV software has been developed to display scrollable stereoscopic (or panoramic) views of a scene or an object (e.g., a horizontal 360-degree scrollable view, a vertical 360-degree scrollable view, or a spherical 360-degree scrollable view).

The local office 103 may include a transmission controller 122 (which can be a native broadcast content provider, an intermediary broadcast content provider, and broadcast computing device). Although shown separately, the transmission controller 122 may be combined with one or more of the push server 105, the content server 106, and the application server 107. The transmission controller 122 may be placed outside of the local office 103 and may communicate with the IV devices 118 through a mobile communication network, or other types of communication network.

The transmission controller 122 may store immersive video (IV) content. The IV content may include, for example, 360-degree video frames, stereoscopic video frames for 3D viewing, panoramic video frames, virtual reality image frames, augmented reality frames, etc. The 360-degree video frames may have less than a full 360-degree view. The transmission controller 122 may also store audio content and other content (e.g., tactile information, etc.) that replicate a real-world or imaginary environment. Users can interact with an IV environment using IV devices 118. An IV device 118 may only display a partial region of the available IV content to simulate each user's limited FOV within the IV environment. In an IV system, a user may change his/her FOV within the IV environment by moving his/her head, moving a control stick, or otherwise providing a camera moving command. Camera moving commands may include, for example, panning, tilting, rotating, and zooming the FOV. For example, if a user turns his/her head while viewing an immersive video using a head-worn display, the display may detect the motion (e.g., via internal accelerometers), and may adjust the image displayed to the user to show a different viewing angle and a different portion of the overall available video. Sensors equipped in the IV devices 118 may capture and/or otherwise detect motion and positional data of the user caused when the user moves his/her bodily part, e.g., the user's head. IV systems can interpret the user's motion and positional data to determine and display the user's new FOV in the IV content.

IV data may be created by taking multiple photographs, moving pictures, or video images of a scene or an object using a 360-degree image capturing device, e.g., 360-degree camera arrays, an omnidirectional camera, etc. Examples of IV data include 360-degree video frames. A 360-degree view taken by the 360-degree image-capturing device at a specific time and location may be reconstructed to form a 360-degree video frame, which may provide a contiguous panoramic view for the specific time point and location. The time point and the location ("the viewing location") may be stored as metadata in association with the corresponding 360-degree video frame. A 360-degree image-capturing device may create a time sequence of 360-degree panoramic video images. For example, the 360-degree camera arrays may capture a set of 360-degree video frames with a certain frame rate, e.g., 15, 30, or 60 frames per second (fps).

More than one 360-degree image capturing device may be utilized to simultaneously generate multiple sets of 360-degree video frames at different viewing locations. Viewing locations may also be referred to as vantage points. For example, a plurality of drones may include 360-degree image capturing devices to capture video content for a live football game. Additionally or alternatively, helmets of football players may include, for example, horizontal 360-degree image capturing devices, which can capture horizontal 360-degree view. The vantage points may be mobile or static. The identification of each 360-degree image-capturing device may also be stored as metadata and the metadata may be associated with the 360-degree video frames captured by the respective 360-degree image-capturing device.

Immersive video need not be a full sphere of 360-degree view. For example, a video frame of an immersive video content may be anything beyond a traditional flat screen presentation allowing viewers to change their FOV. Some examples include views of a hemisphere, spherical cap, spherical segment, spherical sector, spherical wedge, 180-degree panorama, and the like. The partial region of an immersive video frame that is being displayed and that corresponds to a user's current FOV may be referred to as a display region of the respective immersive video frame. While some immersive video content may allow users to change their FOV to see the full sphere of a 360-degree scope of possible FOV changes, some other immersive video content may be limited to see less than such a full sphere FOV (e.g., certain panoramic view video content allows only horizontal FOV change, and may offer less than a full sphere, such as a 360-degree strip, or a partial arc, etc.).

An IV device 118 may be configured to receive only the display regions of immersive video frames. For example, this may reduce consumption of bandwidth and memory resources. However, if the user changes his/her FOV under such a configuration, the IV device may be unable to provide a smooth IV experience. Certain portions of immersive video frames corresponding to the user's changed FOV may not have be received by the IV device by the time the user's FOV shifts. This could result in a lag between change of the user's FOV and availability of content to display in the new FOV. Such a lag may deteriorate the user's virtual reality experience. In order to address such lags, an immersive video frame could be transmitted, in its entirety, from a remote server over a network and to the user's IV device 118. However, and because the user's FOV is restricted to a small portion of each immersive video frame at any given moment, this may consume a relatively large amount of network bandwidth to transmit data corresponding to the image content beyond the user's FOV. Further, a relatively large amount of memory resources of each IV device would be used to store the immersive video frames of those regions of the immersive video frame that are not within the user's FOV and thus not displayed and/or otherwise utilized by the IV display device.

By monitoring the user's FOV and transmitting only a subset of the available immersive video, the use of transmission and memory resources can be reduced. For example, the transmission controller 122 may determine and send subareas of the total areas of the video frames of IV media content items. A subarea of an immersive video frame may include less than the total area of the immersive video frame, in other words less than an entire immersive video frame. The subarea may be defined using spatial coordinates such as, for example, an area of pixels of an immersive video frame or another type of coordinate scheme for the immersive video frame. The subarea may correspond to, for example, a user's current FOV, a predicted FOV, a location of an event of interest in the immersive video frame, and other example locations of the immersive video frame which will be appreciated with the benefit of this disclosure. The subarea of an immersive video frame may be sent to a user device for playback instead of the total area of the immersive video frame. Since the subarea of the immersive video frame is what is sent (e.g., transmitted) to a user device for playback, the subarea is referred to herein, for convenience, as a transmission region.

An IV media content item may include immersive video frames, immersive audio data, and any other spatial human sensory data. Immersive audio data may, for example, indicate a spatial area from which an audio sound originates. The immersive audio data and other immersive human sensory data may be associated with the immersive video frames. For example, the immersive audio data may be synchronized with immersive video frames. The display region of the immersive video frames may change as the FOV changes. The output of the immersive audio data may thus also change according to changes to FOV. The transmission controller 122 may determine transmission regions in an immersive video frame using an FOV change prediction algorithm. Such an algorithm may be based on historical FOV change data and other prediction-assistance information. Examples of information that may be used for such prediction include information retrieved from the immersive video frames, immersive audio data, and/or any other immersive human sensory data. Examples of such sensory data include an object that may entice a human to change an FOV, such as a visual flash in a certain section of an immersive video frame, exploding sounds in a certain section of immersive audio data, a tactile feedback generated by a wearable device, and the like.

The transmission controller 122 may change various characteristics of a transmission region. Such characteristics may include, for example, a size of the transmission region, a location of the transmission region, a resolution of the transmission region, and the like. Changes to the transmission region may be based on a prediction of how a user field-of-view will change.

Figure 4:
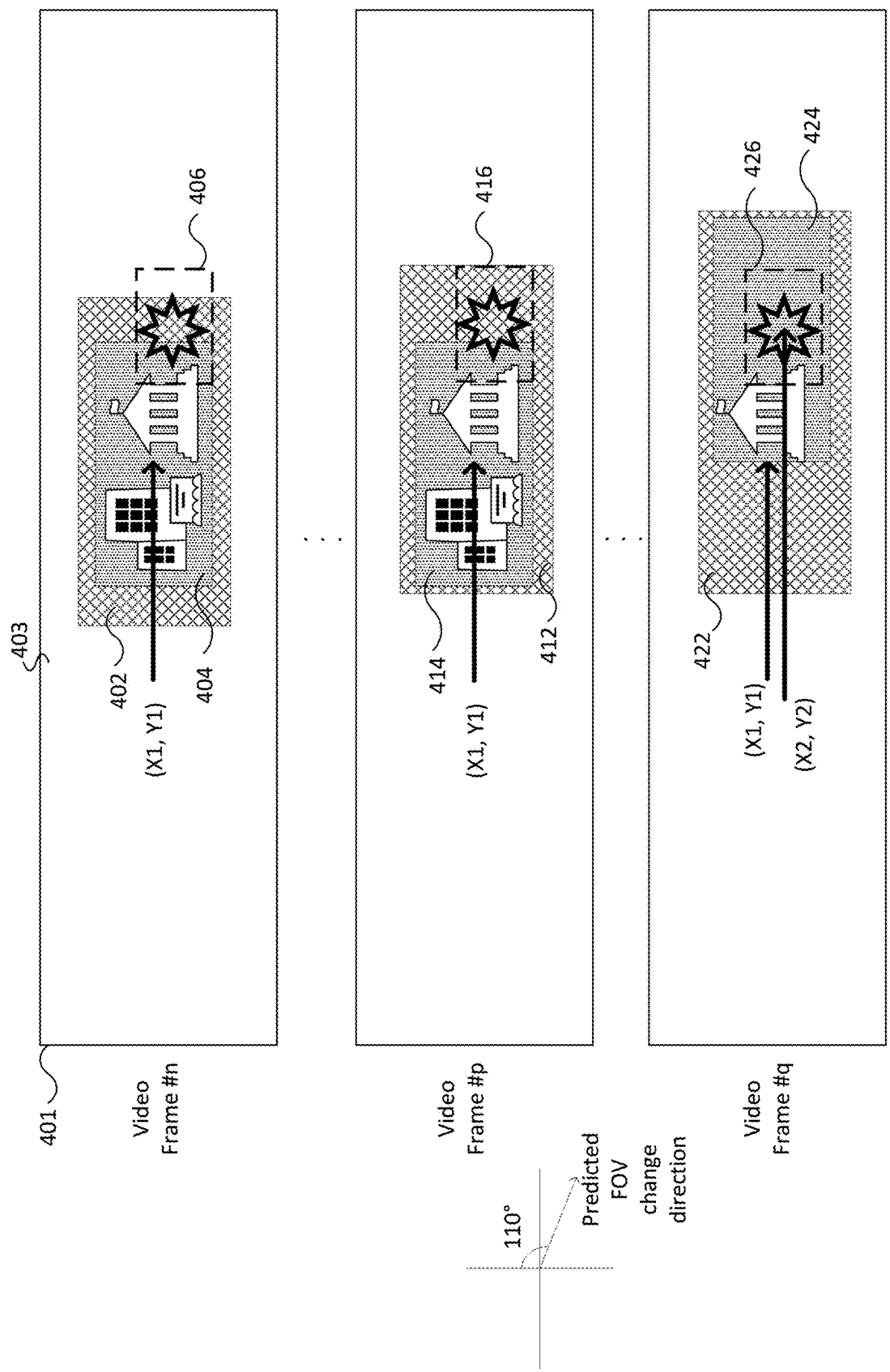
FIG. 4 shows an example of transmission regions and display regions in immersive video frames.

Turning briefly to FIG. 4, FIG. 4 shows transmission regions, display regions, and other concepts discussed herein using an example of a set of immersive video frames # n, # p, and # q. Although the video frames # n, # p, and # q are depicted having rectangular shapes in FIG. 4 for convenience, these video frames may represent any other shape, such as a spherical or hemispherical view of an immersive video frame as mentioned above. The immersive video frames include a transmission region transmitted from the transmission controller 122 to an IV device or (e.g. IV device 118). Regions other than the transmission region in an immersive video frame may be referred to as a non-transmission region. For example, the video frame # n in FIG. 4 shows a transmission region 402 and a non-transmission region 403 of the video frame # n that surrounds the transmission region 402. A display region 404 may be included in the transmission region 402. The display region 404 corresponds to the portion of the immersive video frame that is actually displayed on a display of the IV device at the appropriate time during playback of the immersive video frame. The location of the display region 404 in the video frame # n is determined based on the FOV of the IV device during playback of the video frame # n. Additional details regarding transmission regions and display regions will be described below.

Turning back to FIG. 1, transmission controller 122 may transmit determined transmission regions of immersive video frames, immersive audio data, and any other immersive human sensory data to the IV devices 118. For example, the transmission controller 122 may transmit determined transmission regions of 360-degree video frames, 360-degree audio data, and/or any other 360-degree human sensory data to the premise 102 such that the IV devices 118 receive the determined transmission regions via the network 120. The IV devices 118 may transmit indications of changes to an FOV to the transmission controller 122 via the network 120. The IV devices 118 may include a mobile communication modem or other types of wireless communication modules, such as Bluetooth®, and may communicate with the transmission controller 122 without connecting to a local area network, e.g., the network of the premises 102.

Figure 2:
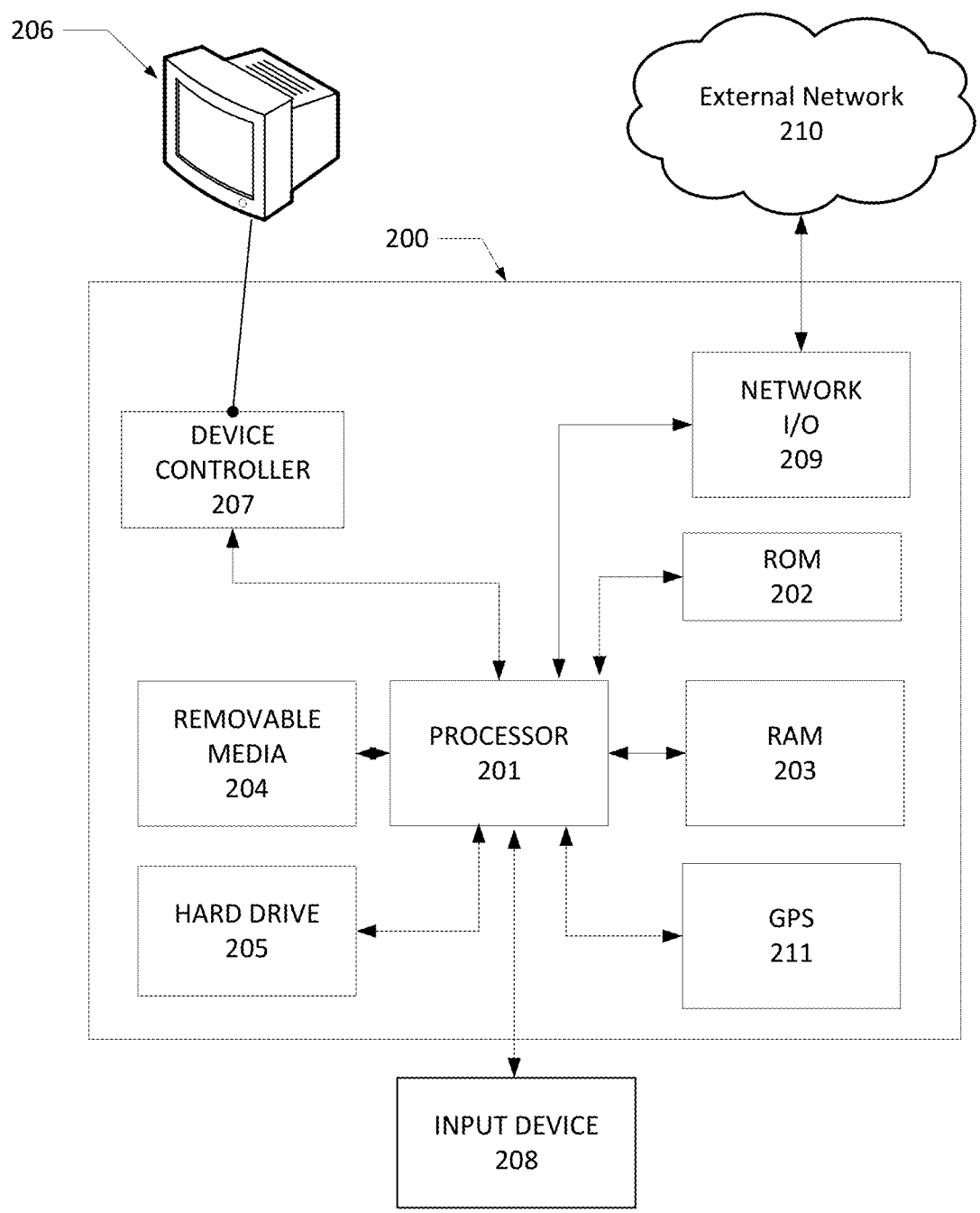
FIG. 2 shows an example computing device.

FIG. 2 shows example hardware elements that can be used to implement the various computing devices discussed herein. A computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television, a mobile phone display, an IV display in a head-mounted display device), and may include one or more output device controllers 207, such as a video processor. There may also be one or more user input devices 208, such as a remote control, keyboard, mouse, touch screen, microphone, an input receiver for a wearable device, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. The network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network.

The computing device 200 may include a location-detecting device, such as a global positioning system (GPS) microprocessor 211, which can be configured to receive and process global positioning signals and determine, with possible assistance from an external server and antenna, a geographic position of the computing device. The computing device 200 may be an IV device 118 and may include various sensors (e.g., a positional sensor, an acceleration sensor, a gyroscope, a magnetometer, etc.) for IV experiences. Such sensors may include, for example, a positional sensor, an acceleration sensor, a gyroscope, a magnetometer, etc. which may be used for sensing user's movements such as those that cause a change to the FOV. An IV device 118 may include, or communicate with, an immersive audio output device and other devices to output other immersive human sensory data. For example, an IV device 118 may include or be configured to connect to a 3D-headset. An IV device 118 may also or alternatively include or be configured to communicate with other wearable devices, such as a hand-wearable device or a foot-wearable device. The computing device 200 may also be servers 105, 106, 107, and 122 or other devices shown in FIG. 1.

While FIG. 2 shows an example hardware configuration, one or more components shown in FIG. 2 may also or alternatively be implemented as firmware or software.

Modifications may be made to add, remove, combine, divide, etc. components of the computing device 200 as desired. Additionally, the components shown may be implemented using basic computing devices and components, and the same components (e.g., processor 201, ROM storage 202, display 206, etc.) may be used to implement other computing devices and components described herein. For example, the various components herein may be implemented using computing devices having components such as a processor executing computer-executable instructions stored on a computer-readable medium, as shown in FIG. 2. Some or all of the entities described herein may be software based, and may co-exist in a common physical platform (e.g., a requesting entity can be a separate software process and program from a dependent entity, both of which may be executed as software on a common computing device).

Examples include computer-usable data and/or computer-executable instructions, such as one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid-state memory, RAM, etc. Such instructions may be executed by one or more processors to cause a computing device to perform operations described herein. The functionality of program modules may be combined or distributed as desired. In addition, such functionality may be implemented in whole or in part in firmware or hardware equivalents such as integrated circuits, field programmable gate arrays (FPGA), and the like.

Figure 3:
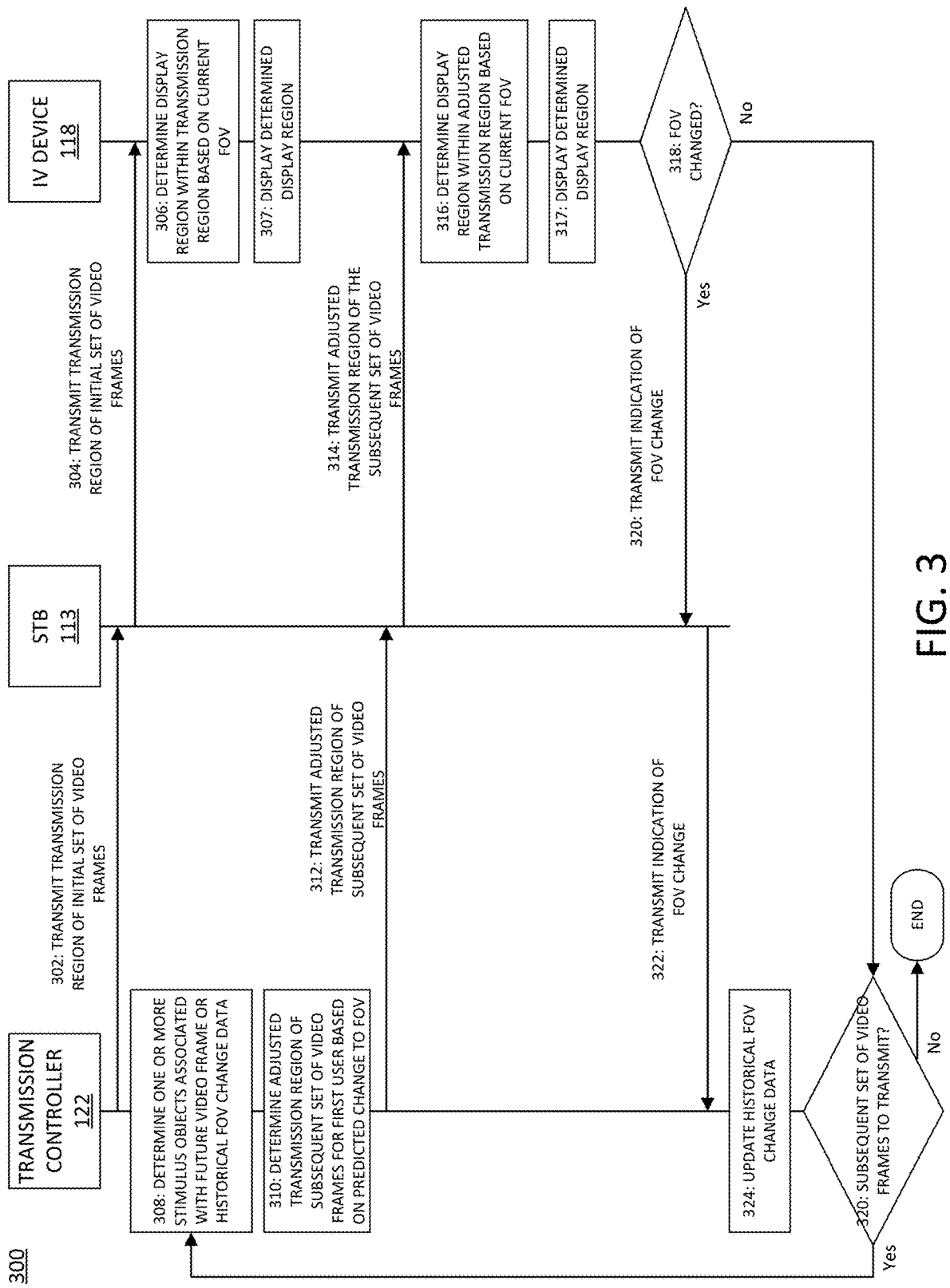
FIG. 3 shows an example of a message flow diagram for determining transmission regions.

FIG. 3 shows an example with reference to an STB (e.g., the STB 113 of FIG. 1), a transmission controller (e.g., the transmission controller 122 of FIG. 1), and a user device (e.g., the IV device 118 of FIG. 1). The operations discussed below, however, could also or alternatively be performed by a gateway (e.g., gateway 111 of FIG. 1) or another type of computing device.

A system may include transmission controller 122, a set-top box (STB) 113, and an IV device 118, as shown in FIG. 3. A user of IV device 118 may be a person who has not signed in or otherwise indicated a particular user identity. Alternatively, the user of IV device 118 may be a person who signed in to (or in connection with) the IV device 118 and provided the STB 113 with an identification of the IV device 118 and information about the user. The information about the user may include one or more of various kinds of information such as an identification, gender, age, group, etc. In another example, an unspecified user may use the IV device 118, and the IV device 118 may provide the identification of the IV device 118 without providing private information of the unspecified user.

FIG. 3 shows an example of a message flow diagram 300 for determining portions of video frames that may be selected for transmission based on a user's FOV (FOV). The steps in FIG. 3 are described with respect to FIG. 4, which shows an example sequence of frames.

The immersive video frames shown by way of example in FIG. 4 represent some of the video frames in the sequence of video frames of the immersive video that would be processed during the example steps shown in FIG. 3. Other immersive video frames that precede and that are subsequent to the example video frames of FIG. 4 may likewise be processed during the example steps shown in FIG. 3 for transmission and playback of immersive video content. A sequence of video frames may include a current video frame that is currently being captured, transmitted, processed, or output for display. A sequence of video frames may also include an upcoming video frame that is to be captured, transmitted, processed, or output for display at some point in the future. The upcoming frames of a sequence of video frames include those video frames that are positioned after (subsequent to) a particular video frame (e.g., the current video frame) in the sequence. Accordingly, an upcoming video frame may also be referred to as a subsequent video frame.

The transmission controller 122 may set up an IV content service for the IV device 118 in response to a request (not shown) from the IV device 118. For example, the IV device 118 may be a virtual reality (VR) headset display. A user may put the IV device 118 on his/her head and begin to watch an immersive movie that allows the user to turn his/her head and look in different directions to see the scenes in the movie. The transmission controller 122 may begin to transmit video portions of the movie to the IV device 118. That transmission to the IV device 118 may be directly to the IV device 118 or to a computing device communicatively coupled (directly or indirectly) to the VR headset display. As shown in the example of FIG. 3, the communication between the transmission controller 122 and the IV device 118 may be performed via the STB 113. However, in some examples, the IV device 118 may communicate with the transmission controller 122 without communicating with the STB 113. The transmission controller 122 determines specific IV content to be provided to the IV device 118. The IV content may be, for example, a video file that the user has requested to watch. The selected IV content may include multiple immersive video frames. The IV content may also include immersive audio data and other IV data associated with the IV content. The transmission controller 122 may determine an initial set of video frames to be transmitted to the IV device 118. The initial set may include, for example, a few seconds or minutes' worth of full-frame immersive video. This may be useful when a movie begins because the computing device might not know the user's initial viewing direction. Alternatively, the initial FOV may be set to a default FOV, and the initial set of video frames may include only those portions of the video frames corresponding to that default FOV. The overall process may be a looping process, in which the user's viewing direction when viewing one frame (or set of frames) is used to determine portions of later frames (or sets of frames) that will be transmitted to the display device. Non-selected portions may be omitted from transmission, which may conserve bandwidth and processing resources.

In step 302, the transmission controller 122 may determine the transmission regions of the initial set of video frames and transmit those transmission regions to the STB 113. In turn, the STB 113 may send the transmission regions of the initial set of video frames to the IV device 118. A transmission region may be a selected portion of an immersive video frame to be sent to the IV device 118 or the STB 113. The IV device 118 user may view different portions of the received transmission region by changing his/her viewing direction.

The transmission regions of a set of video frames may be determined based on an FOV of the user. As noted above, the FOV may include the portion of the video frame that can be seen by the user (or is currently being seen by the user). The actual FOV may depend on a variety of factors such as the following: 1) the user's viewing direction; 2) the display device's size and dimensions; and 3) a zoom level. The viewing direction may be, for example, identified as a single coordinate in a currently displayed video frame, e.g., the user may be currently looking at the portion of the video frame corresponding to coordinates (400, 323). The FOV may be centered at that viewing direction, having that coordinate in the center, and the remainder of the FOV may be the surrounding portion of the video frame displayed on the display device. The display device's size and dimensions, and the zoom level, may be used to determine which portion (e.g., which pixels) of the video frame surrounding the viewing direction should be included in the FOV. The FOV may be determined by the transmission controller 122, the STB 113, or the user of the IV device 118.

The orientation of the display may determine the FOV, which may, in turn, determine a display portion of an immersive video frame. The orientation of the display may be relative to a reference point in the immersive video, e.g., a location of the immersive video that corresponds to coordinate (0, 0). The display may thus be described, for example, as oriented up, down, left, right, etc. with respect to this reference point. The display may thus also be described as oriented at a particular coordinate. For example, the display may be described as oriented at coordinate (X, Y) in which the center of the display region corresponds to that coordinate. Within any particular orientation of the display, the user may be looking in the same or a different direction. For example, a display may be oriented in an up/left direction to present an upper-left portion of the immersive video in the display region while the user may be looking in a down/right direction at a lower-right portion of the display region. The coordinates for the FOV may indicate, for example, the center of the FOV, the top-left corner of the FOV, etc. For example, the center of the display region may correspond to a location (e.g., X, Y coordinates) within an immersive video frame. The FOV may comprise a region of the immersive video frame (e.g., a region of pixels) around that location. The region may also be based on the zoom level of user's display. For example, the display region may show a relatively smaller portion of the immersive video content when zoomed-in and a relatively larger portion of the immersive video content when zoomed-out. The orientation of a display may also be referred to as the viewing direction.

In FIG. 4, the display of the IV device 118 may be described as oriented at coordinate (X1, Y1) of the video frame # n in FIG. 4. The coordinate (X1, Y1), in this example, is the center of the display region 404 in the video frame # n. The user may keep the display oriented at coordinate (X1, Y1) when the video frame # p is displayed. However, when the video frame # q is displayed, the user may turn his/her head toward coordinate (X2, Y2) at which the flare image 426 is located in the video frame # q. The distance between the two coordinates (X1, Y1) and (X2, Y2) reflects the amount of FOV change. A vector may be used to describe the FOV change direction and velocity. The FOV change direction may be the difference between the orientation coordinates, e.g., (X2-X1, Y2-Y1). The FOV velocity may be the difference between the orientation coordinates divided by the time elapsed between the two video frames # p and # q.

The FOV can depend on the size and dimensions of the display screen. The display devices may include 2D display devices that display 2D images as well as 3D display devices that display 3D images. For a 2D display device, e.g., a smartphone or a tablet, the center of the display screen may be used to determine the FOV and the corresponding portion of the immersive video content to display. For a head-mounted display, the portion of the immersive video content displayed may be larger than that for the 2D display device because the FOV for a head-mounted display may allow a wider FOV. For a head-mounted display, two different FOVs may be determined, and two different portions of an immersive video frame may be provided to two display screens, one for each eye of the user.

The default FOV may be predetermined for all users by the transmission controller 122. For example, a broadcaster of a live football game may select, as the initial default FOV, the middle of the field and facing one end of the field. Alternatively or additionally, different default FOVs may be assigned to various groups of IV devices 118. For example, users of a first group who are interested in a first team may have a default FOV different from a default FOV of users of a second group who are interested in a second team.

The transmission controller 122 may transmit different portions of the first video frame to the IV device 118 via the STB 113 so that a user of the IV device 118 may view the received video frame and determine an initial FOV among the different portions of the first video frame. For example, the IV device 118 may transmit to the transmission controller 122 information indicating an initial direction and an initial zoom level of the IV device 118 so that the transmission controller 122 knows the current FOV of the IV device 118.

An initial FOV is an FOV of an IV device when playback of IV content starts. The initial FOV may be a preselected FOV or a user-selected FOV. The initial FOV may be determined such that the initial FOV corresponds to the orientation of the IV device 118 when playback of the IV content starts. Alternatively or additionally, the initial FOV may be determined to be a server-selected coordinate in the first immersive video frame of the IV content. For example, the transmission controller 122 may be a server that selects an initial FOV. Different initial FOVs may be preselected for different users. In such a configuration, the transmission controller 122 may determine the transmission regions of the initial set of video frames such that each transmission region includes a display region corresponding to the initial FOV. For an initial FOV selection for IV video content, the transmission controller 122 or the STB 113 may determine an initial FOV to be used for multiple users. For example, for a first group of users who are fans of a first team, an initial FOV may be selected such that the initial FOV for those users corresponds to the center of the field from that team's side at the start of the game.

FIG. 4 shows examples of transmission regions and display regions in immersive video frames that can be used to implement various features described herein. FIG. 4 shows an example (using frame # n) of a transmission region 402, shown in a grey box, as it relates to the overall immersive video frame 401. The overall frame 401 is shown as a wide rectangle, and a smaller portion, the display region 404, is the portion of the immersive video frame that is presented on the display of an IV device. In frame # n, the entire frame 401 was not transmitted to the display device. Instead, only a transmission region 402 was sent. Only a subset of the transmission region 402 (the display region 404) was initially displayed (or expected to be displayed). That display region 404 may have been the same region of the immersive video that the user was watching in a prior frame. Before frame # n is displayed, however, the user may slightly move the FOV. To account for this, the additional portions of the transmission region 402, outside of the display region 404, allow the display device to display that portion of the immersive video frame corresponding to the changed FOV. The subsequent frames # p and # q in FIG. 4 show how the transmission region may also allow for a different display region.

The immersive video frames # n, # p, # q in FIG. 4 may be consecutive video frames (e.g., video frame # p corresponds to video frame # n+1, and the video frame # q corresponds to video frame # n+2). One or more video frames may be positioned between the video frame # n and the video frame # p and between the video frame # p and the video frame # q (e.g., video frame # p corresponds to video frame # n+5, and the video frame # q corresponds to video frame # n+10).

An immersive video frame may include a 360-degree view or a portion of a 360-degree view. The 360-degree view may be a spherical image captured from a specific point-of-view. Vertical FOV view change may be limited while horizontal FOV view change is unlimited (or vice versa). For example, a horizontal panoramic view may permit the user able to turn left and/or right a full 360 degrees while the user may only be able to look up and/or down through only a 45-degree FOV, such that the total available image represents a belt or band instead of a full sphere. Accordingly, a portion of a 360-degree view may be prepared for each video frame of the belt or band in this example. The example video frames in FIG. 4 are shown as rectangular shapes and thus correspond to a portion of a spherical image (e.g., a belt or band) captured from a specific point-of-view.

The IV device 118 displays the display regions of the immersive video in sequence. Portions of the immersive video frames other than the display regions, such as the transmission regions outside of the display regions, may not be displayed to the user. Transmitting only those portions of the immersive video frames corresponding to the transmission regions rather than the entire immersive video frames may reduce the amount of network bandwidth used to transmit immersive video to multiple users. Statistical algorithms may enhance the prediction of FOV changes and allow reduction of the sizes of the transmission regions, which may further reduce the amount of network bandwidth used to transmit the immersive video. Examples of the statistical algorithms will be described later in more detail.

The transmission region 402 of frame # n includes areas beyond the display region 404 to account for possible movement of the FOV before the frame # n is displayed. The size of those areas can be determined based on a prediction of what the user may look at in frame # n. For example, if the user is predicted to look toward the right side of the frame # n, then the area on the right side of the transmission region 402 may be larger than an area on the left side of the transmission region. The transmission controller 122 may also predict an amount of FOV change between a currently displayed video frame and a subsequent video frame. Based on that prediction, the transmission controller 122 may determine a transmission region of the subsequent video frame to include a portion of the video frame to display when the predicted FOV change occurs. For example, FIG. 4 shows that video frames # n, # p, and # q each include a flare image 406, 416, and 426, respectively. Before displaying frame # q, the transmission controller 122 may predict that the user will move the FOV to view the flare image 416 and thus select the transmission region 412 such that it includes that portion of the video frame # p that encompasses the flare image 416. The IV device 118 may thus be prepared to display the portion of the video frame # p that includes the flare image 416 if the user moves the FOV as predicted.

The transmission controller 122 may predict an amount of FOV change between the currently displayed video frame and a subsequent video frame. For example if the transmission controller 122 identifies the flare image 406 in the video frame # n as an item of interest, then the transmission controller 122 may predict the user will move the FOV to view the flare image 406. In other words, the transmission controller 122 may predict that the flare image 426 in video frame # q will likely be included in the display region 424 during playback of the video frame # q. The distance between the center, (X1, Y1), of the display region 404 in video frame # p and the center, (X2, Y2), of the display region 424 in video frame # q corresponds to the change of FOV.

The transmission controller 122 may predict that the user will move the FOV to view the flare image 406 in the display region 406 and the user will likely start to move the FOV after a response delay. The transmission controller 122 may predict that the user will view the flare image 426 during playback of the video frame # q. The transmission controller 122 may thus enlarge the transmission region 422 to include the predicted FOV change so that the user can view the display region 424 during playback of the video frame # q.

The transmission controller 122 may analyze the prediction accuracy based on actual FOV change data. For example, after receiving the transmission regions 402, 412, 422, the IV device 118 may display the display regions 404, 414, and 424 during playback of the video frames # n, # p, # q, respectively. The IV device 118 may detect movement of the FOV toward the flare image 426 after displaying the display region 414. As a result, the IV device 118 can display the display region 424 based on an FOV change. In FIG. 4, the prediction was accurate because the user actually moved the FOV toward the flare image 426 before and/or during playback of the video frame # q in which the IV device 118 displayed the display region 426. If, however, the user does not move the FOV toward the flare image 426 before and/or during playback of the video frame # q, then the IV device 118 may display a display region having the same center coordinate, (X1, Y1), as the previous video frame # p. In this case, the transmission controller 122 may determine that the prediction was not accurate with respect to the video frame # q.

Metadata of the immersive video content may be used to identify items of interest in the immersive video content. For example, the metadata may include information indicating that, at time, T, in the immersive video, an item of interest will appear at coordinate (X, Y). The transmission controller 122 may use this information to determine what portions of the immersive video should be sent as the transmission region for a video frame corresponding to the time, T. Items of interest in immersive video may be referred to as stimulus objects in that they may stimulate a user to change the FOV in order to view those items of interest. Users may find some items of interest to be more interesting (more stimulating) than others. The likelihood that an item of interest may stimulate a user to change the FOV may be quantified and referred to as a stimulus strength. An item of interest having a higher stimulus strength may be more likely to stimulate a user to change the FOV than another item of interest having a relatively low stimulus strength.

The transmission controller 122 may predict a probability of an FOV change. For example, as shown in FIG. 4, the flare image 406 may have a higher stimulus strength than that of the building images in the display region 404. Based on this, the probability of FOV change toward to the flare image 406 may be higher than other FOV change possibilities. If there are multiple stimulus objects at different coordinates of an immersive video frame (e.g., stimulus object in display region 661 and stimulus objects 666 and 668 in FIG. 10), FOV change probabilities toward the multiple stimulus objects may be calculated in proportion to the respective stimulus strength. The probability of an FOV change may range from 0-100% and may depend on the number of stimulus objects a user might move the FOV toward.

In the display region 404 (FIG. 4), a portion of flare image 406 is displayed near the right edge of the display region 404. In comparison with other objects, the flare image 406 may be more likely to draw the viewer's attention. The immersive video may comprise metadata identifying stimulus objects by location (e.g., coordinates within the video frame) and, in some cases, by stimulus strength (e.g., quantifying the likelihood a stimulus object will attract the user's attention). For example, the flare image 406 may have higher stimulus strength than a static building because the dynamic visual changes of the flare image 406 might be more likely attract viewers' attention.

Figure 10:
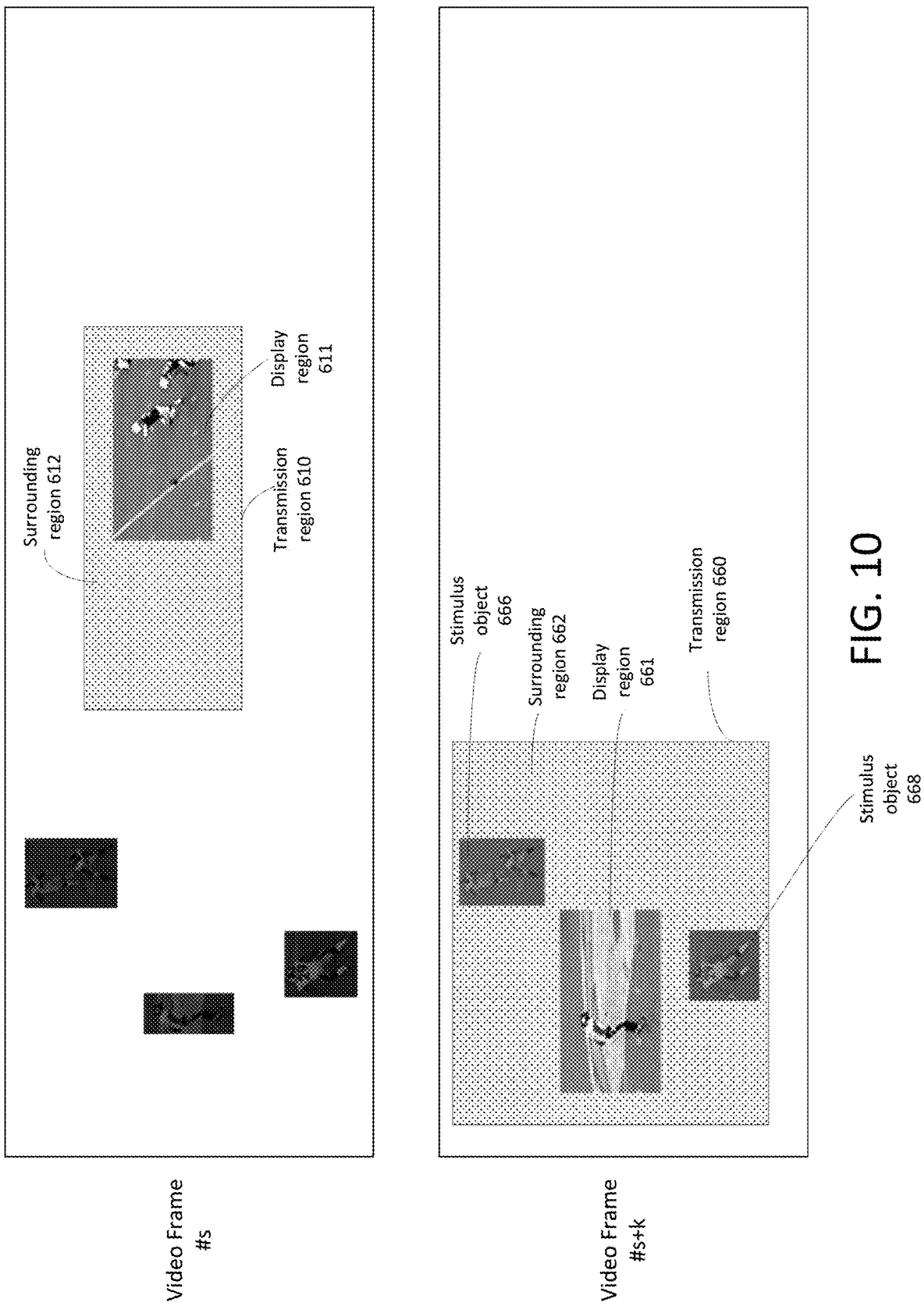

The transmission controller 122 may select a certain quantity of stimulus objects from those available. For example, the transmission controller 122 may select the top x number of stimulus objects having the highest stimulus strengths and disregard those stimulus objects having lower stimulus strengths. The transmission controller may also select those stimulus objects having a stimulus strength that meets a stimulus strength threshold. The transmission controller 122 may expand transmission regions to include the coordinates of the selected stimulus objects as well as an area beyond the selected stimulus objects. Referring briefly to FIG. 10, the transmission region 660 of video frame # n+k includes the stimulus objects 666 and 668 as well as areas beyond the stimulus objects 666 and 668. Stimulus strength will be described later in more detail.

The transmission controller 122 may determine the flare image 406 (FIG. 4) is the strongest stimulus object available during playback of the video frames # p and # q. Although the video frame # n may include other stimulus objects, the flare image 406, having the highest stimulus strength of the available stimulus objects, may be the most influential factor in predicting the FOV change. Based on a prediction of the FOV change toward the flare images 416 and 426, the transmission regions 412 and 422 may be determined, respectively. Since the video frame # n precedes the video frames # p and # q, the size and location of the transmission region 402 may be used to determine the size and location of the transmission regions 412 and 422. Additionally or alternatively, the transmission region 422 may be determined based on the size and location of the transmission region 412. The size, shape, and/or location may be the same or different from transmission region to transmission region in a sequence of immersive video frames. For example, transmission regions 402, 412, and 422 all have a similar rectangular shape as shown in FIG. 4. Transmission regions 402 and 412 have a similar size but different locations with transmission region 412 shifted slightly to the right in video frame # p. Transmission region 422 has a larger size than transmission regions 402 and 412 as also shown in FIG. 4. The resolution of the transmission regions may also differ in a sequence of immersive video frames. For example, a relatively larger transmission region may have a relative lower resolution while a relatively smaller transmission region may have a relatively higher resolution.

Future transmission regions can be determined to include all coordinates of the display region currently displayed to the user. For example, the transmission region 412 of video frame # p includes the display region 414, which the same display region as the display region 404 previously showed to the user in video frame # n. The transmission region 422 of video frame # q, however, includes only a portion of the display regions 404 and 414 of previous video frames # n, # p. Since the user might maintain the current FOV, the transmission controller 122 may determine future transmission regions for subsequent video frames to include some or all of the display region corresponding to the current FOV. For example, the transmission controller 122 may determine the transmission regions 402, 412, and 422 during playback of a video frame preceding the video frames # n, # p, and # q. The FOV at the time when the transmission controller 122 determines the transmission regions 402, 412, and 422 may be considered in determining those transmission regions. In FIG. 4, the transmission region 422 in video frame # q may be enlarged to include both the original transmission region 402 of video frame # n (because the display was oriented toward the display region 404 during playback of video frame # n) as well as the additional portion of the video frame # q that encompasses the flare image 426 (because the user is predicted to change the FOV to view the flare image 426 during playback of video frame # q). In the example of FIG. 4, the display region 424 in the video frame # q has also shifted from the location of the display region 414 in the video frame # p because the user has moved the FOV to view the flare image 426. The transmission region 422 may have been determined and transmitted to the IV device 118 in advance based on the predicted FOV change. By transmitting a transmission region that is larger than the display region, and that includes areas that the user is predicted to view, the IV device 118 may provide a smooth transition between display regions as the user moves the FOV to view a stimulus object. The display region 424 can be displayed smoothly without significant delays even if the user quickly moves the FOV in response to a stimulus object, e.g., the flare image 406.

The predicted change to the FOV may be based on one or more subsequent video frames to be sent to an IV device. For example, during playback of a first set of video frames #1-10, the transmission controller 122 may receive a second set of video frames #11-20. The second set may be used as a basis to predict a change to the FOV. The transmission controller 122 may determine that the second set of video frames includes one or more stimulus objects, e.g., the flare image 406 shown in FIG. 4 or other types of stimulus objects such as audible stimulus objects.

If a stimulus object is determined to have a relatively higher stimulus strength (e.g., the flare image 406, 416, and 426 in FIG. 4) in the second set of video frames, then the transmission controller 122 may determine that the current FOV of the IV device will move toward that stimulus object during playback of the second set of video frames. For example, as shown in FIG. 4, the transmission controller 122 may determine the transmission regions 412, 422 to send to the IV device frames based on the predicted change to the FOV.

In step 304 of FIG. 3, the STB 113 may transmit, to the IV device 118, the transmission regions received for the video frames in the initial set of video frames. For example, the transmission region 402 of video frame # n in FIG. 4 may be transmitted to the IV device 118. In step 306, the IV device 118 may determine the respective display regions within the received transmission regions based on the current FOV. In step 307, having determined the display regions to display, the IV device 118 may display the determined display regions to the user. For example, during playback of video frames # n, # p, and # q (FIG. 4), the IV device 118 may determine display regions 404, 414, and 424. The IV device 118 may thus only display those display regions 404, 414, 424 from the received transmission regions.

In step 308, the transmission controller 122 may determine one or more stimulus objects included in the subsequent set of video frames that follow the initial set of video frames. As described above, the transmission controller 122 may predict the user will move the FOV to view one of the stimulus objects during playback of the subsequent set of video frames. The predicted change to the FOV may also or alternatively be based on historical data corresponding to historical FOV changes by one or more users. Such data may be referred to, for convenience, as historical FOV change data. The historical FOV change data may be associated with a particular item of immersive video content, a particular region of immersive video content, a particular region of an immersive video content frame, a particular stimulus object of the immersive video content, and/or a particular user that has previously viewed immersive video content. The historical FOV change data may be updated based on indications of FOV changes during playback of immersive video content. For example, if ninety-five our of one hundred viewers move their respective FOVs toward a particular stimulus object during playback of immersive video content, historical FOV change data may be generated or updated to indicate, e.g., a 95% probability that a subsequent viewer will also move the FOV toward that stimulus object during playback of the immersive video content. As shown in FIG. 4, the regions beyond of the transmission regions 402, 412, 422 (the non-transmission regions) may not be transmitted by the transmission controller 112. Alternatively or additionally, the transmission controller 112 may transmit the non-transmission regions of an immersive video frame at a lower resolution relative to the resolution of the transmission region. For example, the resolution of the non-transmission region may be 10% of the resolution of the transmission region.

In step 310, the transmission controller 122 may determine an adjusted transmission region for the video frames in the subsequent set of video frames. An adjusted transmission region of an immersive video frame may be one that differs (e.g., in size, shape, and/or location) from the transmission region of a previous immersive video frame. The transmission controller 122 may determine an adjusted transmission region based on, for example, one or more stimulus objects in the subsequent set of video frames and/or historical FOV change data associated with the subsequent set of video frames. As described above with respect to FIG. 4, the transmission region 412 for video frame # p has a different location than the previous transmission region 402 for video frame # n. Similarly, the transmission region 422 for video frame # q has a different size than the size of the transmission regions 402 and 412 for respective video frames # n and # p. In addition, FIG. 4 shows that the predict change to the FOV toward the flare image 426 during playback of video frame # q was a correct prediction.

As part of step 310, transmission controller 122 may also consider a user's response delay. For example, the flare image 406 appears in the video frame # n of FIG. 4, but the user may not change the FOV until the video frame # q is displayed. In some cases, there might be some delay between a stimulus and a user's response. For example, a delay may occur between the time when a stimulus object is first displayed and the time when a user begins to move the FOV toward that stimulus object. In FIG. 4, for example, the user may start to move the FOV toward the flare image 416 after viewing one or more display regions that include the flare image, e.g., display regions 404 and 414.

The transmission controller 122 may determine a user response delay. In FIG. 4, for example, if a stimulus object in video frame # n is displayed, the user may respond to the stimulus object by moving the FOV when video frame # n+20 is displayed. In this case, the user response delay may be the amount of time used to display 20 consecutive video frames. Accordingly, the determination of the transmission regions for a subsequent set of video frames may be determined based on the user response delay. If a stimulus object, e.g., the flare image 406 in FIG. 4, first appears in the video frame # n, for example, then the transmission controller 122 may predict that the IV device 118 will generate an indication of a change to the FOV when the video frame # q is displayed due to the delay between when the stimulus object is displayed and when the users starts to change the FOV in response.

The user response delay may influence the prediction of a change to the display region or a change to the FOV. The prediction of a change to the display region may influence how the transmission regions are adjusted for subsequent sets of video frames. For example, if the user response delay corresponds to playback of 20 video frames, then a stimulus object first appearing in video frame # n may not result in a change to the transmission region of the video frame # n (or may result in only a slight change to the transmission region of the video frame # n). Instead, the transmission controller 122 may predict a change to the FOV will occur during playback of video frame # n+20 and determine the corresponding change to the display region for the video frame # n+20. In turn, the transmission controller 122 may adjust the location, shape, and/or size of the transmission region for the video frame # n+20 to encompass the predicted display region. The transmission regions of subsequent video frames, e.g., video frame # n+21, may be similarly adjusted. In some instances, the predictions of the transmission controller 122 may not be correct, and a user may maintain the current FOV and corresponding display regions during playback of subsequent video frames.

In step 310, the transmission controller 122 may also or alternatively analyze a set of video frames to identify one or more stimulus objects and to determine a transmission region for each of the video frames. Stimulus objects may include dynamic objects that change shape, size, color, location, etc. during playback of consecutive video frames. When analyzing consecutive video frames, one or more dynamic objects may be identified. Also, the stimulus strengths of dynamic objects may be determined based on the extent to which the dynamic object changes.

In step 312, the transmission controller 122 may transmit the adjusted transmission regions. In the example of FIG. 3, the transmission controller 122 transmits the adjusted transmission regions to the STB 113. In other examples, the transmission controller may transmit the adjusted transmission regions to the IV device 118 as noted above. The transmission controller 122 may transmit immersive content during a live multicasting video streaming session. Here, the transmission controller 122 may receive live-streaming immersive video frames from a content source. The quantity of frames in a set of video frames to be analyzed for predicting user FOV change may be determined based on the playback rate of the immersive video content. For example, the playback rate of the immersive video content may be 60 frames per second (60 fps) such that playback of 300 consecutive immersive video frames occurs in 5 seconds (300 frames÷ 60 frame/second=5 seconds). Additional or alternative playback rates may be used for the immersive video content or between different sets of immersive video frames. For example, the transmission controller 122 may receive immersive video frames #0-299 from a content source and may determine the video frames #0-299 to be the initial set of video frames transmitted by the transmission controller 122 in step 302 discussed above. The number of immersive video frames in a set of video frames may be different in other examples. The transmission controller 122 may analyze this initial set of video frames to identify any stimulus objects they include and their respective stimulus strengths. The subsequent immersive video frames that the transmission controller 122 receives from the content source, e.g., video frames #300-599, may be the subsequent set of video frames for which the transmission controller 122 determines adjusted transmission regions to transmit in step 312. The transmission controller 122 may similarly analyze the subsequent set of video frames to likewise identify any stimulus objects included in those video frames and the corresponding stimulus strengths of any stimulus objects identified. Some of the video frames of a previous set of video frames can be used when analyzing a subsequent set of video frames. For example, video frames #200-299 may be included in the analysis of the video frames #300-599 to enhance the analysis.

Feedback obtained during playback of a particular set of video frames may also be used when analyzing and determining the adjusted transmission regions for a subsequent set of video frames. The feedback may include, for example, indications of changes to the FOV during playback of the particular set of video frames. This feedback may represent one type of historical FOV change data used by the transmission controller 122 and may be used in analyzing a subsequent set of video frames in order to provide, e.g., more accurate identification of stimulus objects and stimulus strengths.

The size of each set of video frames may be dynamically changed based on various parameters. For example, factors such as additional feedback reception or prediction accuracy may be calculated and the size of subsequent sets of video frames may be based on those factors. For example, if the prediction accuracy diminishes or the user changes the FOV more frequently in a short period of time, then the transmission controller 122 may set the size of subsequent sets of video frames to be relatively smaller to enable more frequent prediction analyses and/or increase the average size of transmission regions of subsequent sets of video frames.

The transmission controller 122 may use subsequent video frames received from the content source to analyze previous sets of video frames even if the transmission controller 122 has not yet received enough of the subsequent video frames to form a new set of video frames. For example, a subsequent set of video frames may include video frames #600-899. The transmission controller 122 may use video frames #600-649 received from the content source in an updated analysis of a previous set of video frames, e.g., previous video frames #300-599, although the transmission controller 122 has not yet received the remaining video frames #650-899 of the subsequent set of video frames. Also, if the transmission controller 122 receives the remaining video frames #650-899, the transmission controller 122 may analyze the subsequent set of video frames #600-899 to identify one or more stimulus objects and corresponding stimulus strengths in those video frames.

In step 312, the transmission controller 122 may transmit, to the STB 113, the adjusted transmission regions of the subsequent set of video frames. In step 314, the STB 113 may transmit, to the IV device 118, the adjusted transmission regions of the subsequent set of video frames. In step 316, the IV device 118 may similarly determine the display regions for the adjusted transmission regions received based on the FOV. In step 317, having determined the display regions to display, the IV device 118 may display the determined display regions to the user.

In step 318, the IV device 118 may determine whether FOV the user has moved the FOV. If the FOV does not move the FOV, then the IV device 118 does not transmit any indication that the user has moved the FOV and playback of the immersive video content may continue as normal. For example, in step 320, the transmission controller 122 may determine whether the subsequent set of video frames is available to transmit. If the subsequent set of video frames is available, then the transmission controller may repeat steps of 308-318 for that subsequent set of video frames. If a subsequent set of video frames is not available, e.g., if the immersive video content has finished playback, then the process may end.

When a user of the IV device 118 moves the FOV, the IV device 118 may generate an indication of the change to the FOV. If the FOV changes in step 318, the IV device 118 may adjust the display regions based on the changes to the FOV. In FIG. 4, for example, the display region 424 in the video frame # q can be displayed when the user moves the FOV toward the flare image 426 because the adjusted transmission region 422 in the video frame # q includes the portion of the immersive video content that includes the flare image 426.

The IV device 118 may transmit the indication of the change to the FOV to the transmission controller 122 via the STB 113. In turn, the transmission controller 122 may update the historical FOV change data, e.g., data associated with a particular video frame, based on the indication received. For example, when a user moves the FOV during playback of a video frame, the IV device 118 may determine the direction, distance, and speed of the change to the FOV. The IV device 118 may transmit the direction, distance, and speed of the change to the FOV to the transmission controller 122 along with an identifier of the video frame, e.g., the video frame number. The speed of the change to the FOV may be based on the time that elapses between when the change to the FOV starts and ends and the distance between the starting and ending point of the FOV.

The transmission controller 122 may determine the accuracy of the previous predictions. For example, the accuracy may be based on the received indications of changes to the FOV from the IV device 118. If the transmission controller 122 does not receive many indications of changes to the FOV during playback of the immersive video content, then the transmission controller 122 may determine that the FOV is fairly static (FOV does not change much) and, in response, modify the prediction for subsequent sets of video frames. For example, if the user does not respond to a stimulus objects, then the transmission controller 122 may modify the stimulus strength (e.g., reduce) for that stimulus object. The transmission controller 122 may also or alternatively modify stimulus strengths of stimulus objects included in subsequent sets of video frames. For example, the stimulus strengths of stimulus objects of the same type may be increased or decreased based on whether the user moved the FOV to view stimulus objects of that type.

The transmission controller 122 may predict subsequent changes to the FOV based on multiple indications of changes to the FOV. For example, if the transmission controller 122 receives multiple indications of changes to the FOV having substantially the same direction within a particular time period, then the transmission controller 122 may predict that the user will continue to move the FOV in that same direction during playback of subsequent video frames. If the direction of the changes to the FOV is substantially the same as the predicted direction of the FOV change, then the transmission controller 122 may determine that the previous prediction was relatively accurate. Other parameters, such as the speed of the FOV change, may be used to determine prediction accuracy. The prediction accuracy may be determined as a numerical value by comparing the prediction parameters with the actual parameters corresponding to the change of the FOV (e.g., comparing actual and predicted parameters such as FOV change direction, speed, user response delay, etc.).

The size of the transmission regions may depend on the accuracy of the predictions. For example, if the transmission controller 122 can predict those portions of the immersive video content a user will move the FOV toward with a relatively high degree of accuracy, then the transmission controller 122 can determine relatively smaller-sized transmission regions to transmit for playback at the IV device 118. Reducing the size of the transmission regions transmitted for playback may reduce the network bandwidth used to transmit those transmission regions. For example, the size of a transmission region may be closer to the size of a display region to reduce the network bandwidth used. Consistently accurate predictions by the transmission controller 122 FOV may allow for transmission regions to have sizes similar to the display regions viewed by the users during playback. Over time, the transmission controller 122 may improve its prediction accuracy by continually updating the historical FOV change data based on the indications of changes to the FOV received from the IV device 118.

Constant and seemingly random changes to the FOV may make it more difficult for the transmission controller 122 to accurately predict changes to the FOV. In circumstances where the transmission controller 122 cannot predict changes to the FOV within a threshold level of accuracy, the transmission controller 122 may enlarge the size of the transmission regions for subsequent sets of video frames. The transmission controller 122 may subsequently reduce the average size of the transmission regions if the prediction accuracy improves. Accordingly, both the prediction accuracy of the transmission controller 122 and the sizes of the transmission regions may fluctuate during playback of a particular item of immersive video content. The transmission controller 122 may also or alternatively adjust prediction accuracy and/or the size of a transmission region between playback of different items of immersive video content.

In step 320, the IV device 118 may transmit the indication of the change to the FOV change to the STB 113. In step 322, the STB 113 may transmit the indication of the change to the FOV change to the transmission controller 122. The transmission controller 122 may aggregate changes to FOVs that have been received from various users. The indications received may correspond to a certain set of video frames or a particular stimulus object as described above. In step 324, the transmission controller 122 may update the historical FOV change data based on the received indications of changes to the FOV. A statistical analysis engine may process the historical FOV change data to enhance the predictions of subsequent changes to the FOV. For example, the stimulus strengths of stimulus objects and the parameters associated with the changes to the FOV (e.g., direction, speed, user response delay) may be used to train the statistical analysis engine. When aggregating changes to FOVs, users may be classified into groups. For example, one classification may be an outlier user group and a non-outlier user group. Another classification may be a majority user group and a non-majority user group. If the changes to the FOVs for a majority of users are substantially similar, then those users may be classified in the majority user group. The changes to the FOVs by the users from the majority group may be used to determine subsequent predictions of FOV changes and to train the statistical analysis engine to enhance prediction accuracy. As the transmission controller 122 receives more and more indications of changes to FOVs, the sample size for the statistical analysis increases, which may result in a better-trained statistical analysis engine.

The IV device 118 may continually provide indications of changes to the FOV during playback of immersive video content (steps 320-322). Accordingly, the transmission controller 122 may continually update the historical FOV change data during playback of the immersive video content (step 324). The transmission controller 122 may thus use those updates determined when determining stimulus objects for subsequent sets of video frames and determining adjusted transmission regions for those subsequent video frames (steps 308-310) as playback of the immersive video content continues. Some of the updates processed in the step 324 may be used to determine transmission regions for another user, another item of immersive video content, or another video frame of immersive video content. For example, once playback of an item of video content is complete for a user, the transmission controller 122 may possess a log of changes to the FOV (e.g., an FOV change log) associated with that item of immersive video content and associated with that user. The transmission controller 122 may thus use that FOV change log when determining the transmission regions should the user again select that item of immersive video content for playback. The transmission controller 122 may also use that FOV change log when determining the transmission regions for that item of immersive video content when another user selects it for playback. The transmission controller 122 may use that FOV change log when determining the transmission regions for another item of immersive video content (e.g., of the same type, in the same genre, etc.) the user selects for playback. The transmission controller 122 may store or otherwise obtain one or more FOV change logs for multiple users and/or for multiple items of immersive video content. An FOV change log may be associated with a user profile of a user. The transmission controller 122 may analyze the patterns of changes to the FOV, e.g., the frequency of FOV changes, average speed of the FOV changes, etc. Further, the transmission controller 122 may analyze types of stimulus objects that caused the user to move the FOV more frequently. The stimulus strengths of various stimulus objects may be adjusted based on the user's personal characteristics and interests. These types of analysis data may be included in the historical FOV change data associated with the user.

Figure 5:
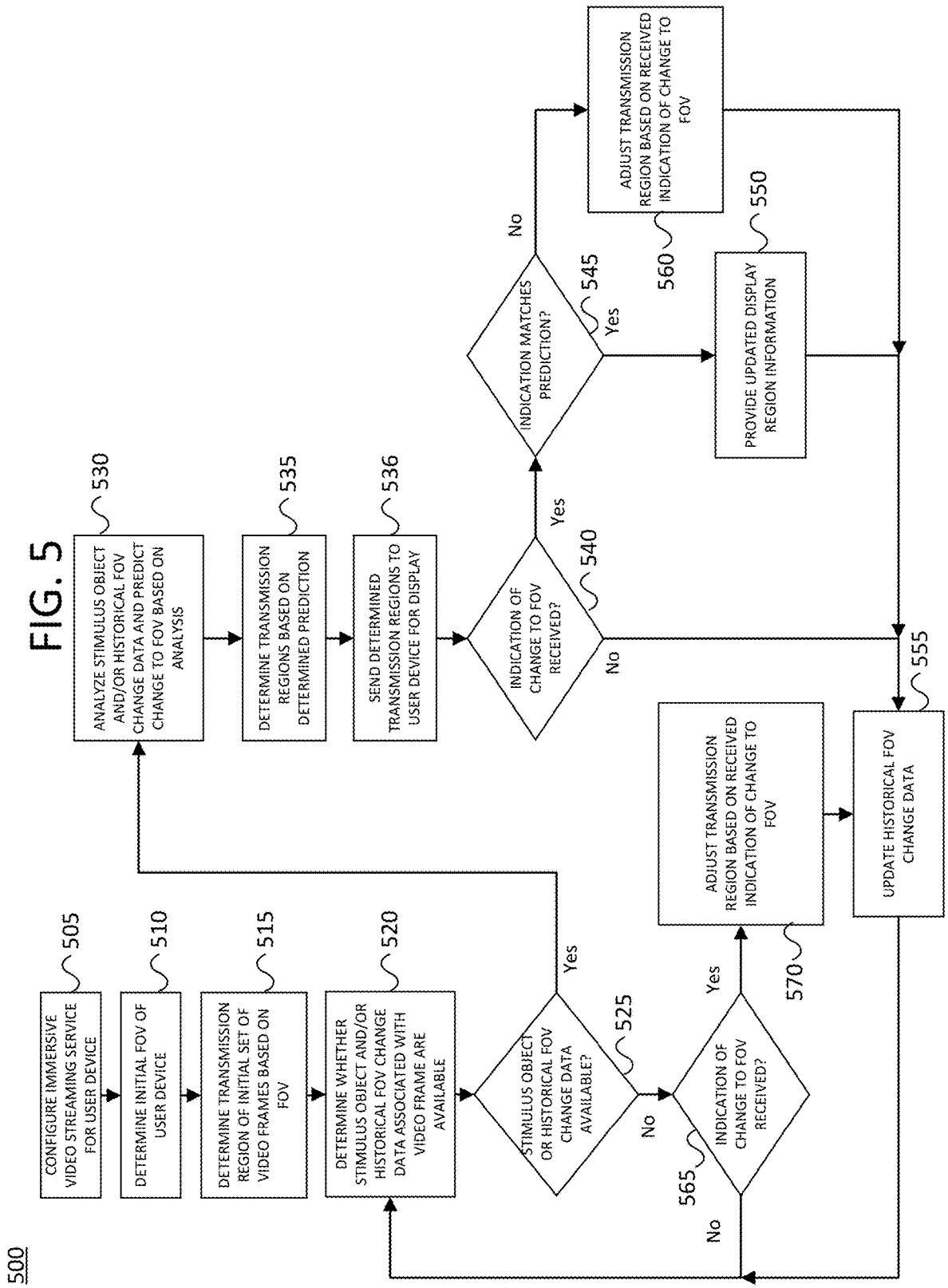
FIG. 5 is a flowchart of example method steps for providing immersive video.

FIG. 5 is a flowchart 500 of example method steps for providing immersive video. The one or more steps of FIG. 5 may be performed by a computing device (e.g., computing device 200, transmission controller 122). A computer-readable medium may store computer-executable instructions that, when executed by one or more processors cause a computing device to perform one or more of the example steps shown in FIG. 5. Although FIG. 5 is described by way of example with respect to streaming immersive video to a user device, other methods or processes may be employed to provide the immersive video content to the user device. In addition, the user device discussed with reference to FIG. 5 may be, for example, the IV device 118 discussed above with reference to FIG. 1.

At step 505, a computing device may configure an immersive video streaming service for one or more user devices. For example, in step 505, the computing device may configure an immersive video streaming service for a user of a user device, e.g., IV device 118. The immersive video streaming service may provide IV content, e.g., 360-degree video content. The immersive video streaming service may be user-specific based on various prior immersive video steaming services provided to the user and previous changes to the FOV received from the user device. For example, the computing device may store a user account of the user and information identifying previous immersive video content consumption of the user. The computing device may receive a user profile and other user-specific information associated the user. The computing device may apply the user profile and/or user-specific information to predict changes to the FOV during playback of the immersive video content for the user. The user profile may include, for example, age, gender, race, height, weight, previous activities and experiences, etc. The computing device may use the user profile and/or user-specific information to identify more relevant stimulus objects and predict changes to the FOV toward those stimulus objects. For example, the historical FOV change data may indicate that FOV changes by younger users tend to be more dynamic (e.g., more random, faster, and/or more frequent) while FOV changes by older users tend to be more static (e.g., slower, less frequent). The historical FOV change data may also indicate that user demographics influence which stimulus objects users are more or less interested in viewing.

Further, the historical FOV change data may indicate patterns of FOV changes for one or more users. Patterns of FOV changes may include, for example, average head tracking speed, gestures, etc. The transmission controller 122 may identify patterns in FOV changes based on indications of FOV changes received from the IV device 118. The transmission controller 122 may utilize the patterns of FOV changes to predict subsequent FOV changes during playback of the same or different IV content. The transmission controller 122 may predict FOV changes for one item of immersive video content based on the patterns of FOV changes associated previous playbacks of that item immersive video content and/or associated with playbacks of other items of immersive video content. The predictions of FOV changes may also be based on patterns of FOV changes associated with other users.

The patterns of FOV changes may be categorized based on various genres of IV content. For example, one pattern of FOV changes for a user may be associated with immersive 3D movies while another pattern of FOV changes may be associated with sporting events. For example, during playback of an immersive 3D movie, the user may tend to keep the protagonist within the display region while during playback of a sporting event, the user may tend to keep the players in proximity to a sporting object (e.g., a football) within the display region. If a pattern of FOV changes is associated with the same genre as the immersive video content currently undergoing playback, then the transmission controller 122 may give that pattern of FOV change a higher weight when using that pattern to predict FOV changes for the current immersive video content. For example, if the current immersive video content undergoing playback is an immersive 3D movie, then the transmission controller 122 may give higher weight to those patterns of FOV changes that are associated with 3D immersive movies when predicting FOV changes for the 3D immersive movie.

The transmission controller 122 may give more weight to either the historical FOV change data or the stimulus objects when predicting an FOV change. For some non-live immersive content (e.g., immersive movies), for example, may users may have similar changes to their respective FOVs, and the transmission controller 122 may give more weight to historical FOV change data than stimulus objects in the immersive video content when predicting changes to the FOV. In some other categories or genres, the transmission controller may give more weight to stimulus objects than the historical FOV change data when predicting changes to the FOV. For example, during playback of live sporting events, useful historical FOV change data might not be available, and users may react differently depending on their interests (e.g., a preferred team), viewpoints (e.g., seat locations), preferences (e.g., focusing on offense or defense), and stimulus objects that may be included in the IV content. As noted above, however, relatively less useful historical FOV change data may be used to predict changes to FOVs during playback of live immersive video content (e.g., historical user change data associated with playback of previous live immersive video content). The transmission controller 122 may give more weight to historical FOV change data as the amount of the historical FOV change data increases. For example, while one or more users are watching a live football game, a user FOV change pattern may be more accurately determined as the amount of the historical FOV change data increases with respect to that user.

In step 510, the computing device may determine an initial FOV of the user device (e.g., the IV device 118 in FIG. 1). For example, the initial FOV may be determined based on a default setting of the computing device, a default setting of the user device, or user-specific information associated with the user. For example, during playback of an immersive sporting event, one group of users may have a preference for one team over the other (e.g., the home team), and the computing device may determine the initial FOV for that first group of users such that playback of the immersive sporting event begins from the perspective of one or more players of the preferred team. The computing device may enable a user to select the initial FOV, and the computing device may provide IV content to the user based on the selected FOV.

Table 1 includes examples of initial FOVs for a live streaming, immersive football game in which playback of the immersive football game may occur from different perspectives, e.g., from the perspective of one or more football players. As seen in Table 1, the initial FOVs may be based on user-specific information.

TABLE 1

Examples of Initial FOVs Based on Examples of User-Specific Information.

| USER SPECIFIC INFORMATION | INITIAL FOV |
| --- | --- |
| Preference for Home Team | Bird's Eye View Perspective: Above and Behind Home Team |
| Preference for Player X of Home Team | First-Person Perspective: Player X |
| Preference for Player Y of Home Team | Over-the-Shoulder Perspective: Player Y |
| Preference for Away Team | Bird's Eye View Perspective: Above and Behind Away Team |

TABLE 1-continued

Examples of Initial FOVs Based on Examples of User-Specific Information.

| USER SPECIFIC INFORMATION | INITIAL FOV |
|---|---|
| Preference for Player Z | Bird's Eye View Perspective: Above and Behind Player Z |
| No Preference | Wide Perspective: Side View of Home Team and Away Team |

Additional and alternative examples of user-specific information and initial FOVs (e.g., high-angle, low-angle, and Dutch/oblique angle perspectives) will be appreciated with the benefit of this disclosure. If it is assumed that a user has no specific preference, the camera view covering both team A and team B may be selected. A user may select an initial FOV from multiple FOVs relative to the action in the immersive video content, e.g., viewpoints that correspond to various sections or seats of a stadium. The initial FOV may also be a default predetermined FOV, e.g., front row on the 50-yard line. A content provider may offer different FOVs at different prices. For example, for immersive sporting events, a content provider may offer premium FOVs (e.g., FOVs corresponding to perspectives from lower-level seats or on-the-field perspectives) at one price and may offer discounted FOVs (e.g., FOVs corresponding to perspectives from upper-level seats) at a different price. In addition, the user may select a different perspective from multiple perspectives available during playback of the immersive video content, e.g., switching between perspectives associated with the home team and the away team.

In step 515, the computing device may determine the transmission regions of an initial set of video frames based on the initial FOV of the user device. The transmission region for each video frame in the initial set of video frames is determined based on the initial FOV. The portion of the transmission region displayed during playback of the video frames—the display region—depends on the initial FOV of the user device. For example, the initial FOV may cause a display region of a transmission region to include the center of a football field and position the center of the football field at the center of a display device of the user device.

3D audio and other human sensory data associated with immersive video content may be output during playback of the immersive video content. 3D audio data includes audio or sounds that can be output from different directions as the FOV changes. 3D audio data may include particular sounds that are associated with particular locations in immersive video frames. During the playback of the immersive video content, the output of the sounds may depend on the FOV. Output of the sounds may be adjusted as the FOV moves toward or away from the sounds. For example, if a sound is associated with a location in the immersive video frame that is to the left of the current FOV, then the sound may be output by an audio output device such that the user perceives the sound as coming from the left side of the user. If the user responds to the sound by moving the FOV to the left toward the sound, then the output of the sound may be adjusted such that the user perceives the sound as coming from the front of the user. Tactile events may be similarly output by a haptic device during playback of immersive video content. For example, if a user feels a tactile event output by a wearable haptic device, then user may change the FOV toward that tactile event.

In step 520, the computing device may determine whether one or more stimulus object and/or historical FOV change data associated with one or more video frames of the immersive content is available. If available (step 525), the computing device may analyze the available stimulus objects and/or historical FOV change data associated with the video frames and predict FOV change requests based on the analysis (step 530) as described above.

During a broadcast of live IV content, there may be a short delay (e.g., seven seconds) between the time the content provider receives the live IV content and the time the content provider broadcasts the content to the users. The analysis of the stimulus objects and/or the historical FOV change data, as well as the predictions of the changes to one or more FOVs, may occur during this delay.

The frame rate of the immersive video content may be, for example, 30 fps with segments of the immersive video content having 60 video frames each. Accordingly, playback of a new segment of immersive video content may occur every 2 seconds (60 video frames/segment÷30 frames/second=2 seconds/segment). A set of video frames of the immersive video content may be a segment of immersive video content, e.g., a 2-second segment of 60 video frames of the immersive video content. Other human sensory data, e.g., audible, tactile, olfactory stimulus data, etc., associated with a set of video frames may be provided with the set of video frames. The computing device may analyze the set of video frames and other human sensory data associated with it in order to identify one or more stimulus objects. The computing device may also or alternatively analyze historical FOV change data associated with the set of video frames. The computing device may use the results of these analyses to predict possible changes to the FOV. For example, when the computing device predicts FOV changes and determines the transmission regions for the $n^{th}$ set of video frames, the computing device may analyze historical FOV change data generated by one or more users during playback of that $n^{th}$ set of video frames.

The computing device may analyze more than one set of video frames. For example, the computing device may receive the $n^{th}$ set of video frames and predict changes to the FOV based on the $n^{th}$ set of video frames, the $(n-1)^{th}$ set of video frames, and the $(n-2)^{th}$ set of video frames. One or more preceding set of video frames may provide more analytical context in identifying and evaluating one or more stimulus objects.

Indications of previous changes to FOVs that are associated with previous sets of video frames may be considered in order to identify relevant stimulus objects for a specific user. For example, when analyzing the $n^{th}$ set of video frames to determine the transmission regions for video frames in that set, the computing device may receive indications of previous changes to FOVs associated with the $(n-k)^{th}$ set of video frames already sent to one or more users. Based on the historical FOV change data associated with the $(n-k)^{th}$ set of video frames, the computing device may identify one or more relevant stimulus objects that prompted those previous changes to the FOVs. The computing device may thus give greater weight to those identified stimulus objects when determining the transmission regions for the $n^{th}$ set of video frames.

Referring back to FIG. 4, the video frame # n and the video frame # p may be included in one set of video frames. The computing device may analyze the set of video frames and determine the flare image 406 has the strongest stimulus strength, e.g., because it has the most visual change. The computing device may thus determine the flare image 406 to be the top-ranked stimulus object. With respect to audio-based stimulus objects, the top-ranked audio-based stimulus object may be the one that is the loudest. In other words, the respective stimulus strengths of multiple stimulus objects may determine the relative rankings of those stimulus objects. In another example, the extent to which the visual aspects of visual stimulus objects change or the loudness of audio stimulus objects may be calculated to determine the ranking of multiple stimulus objects. Historical FOV change data may also or alternatively be used to determine the ranking of multiple stimulus objects. For example, if 90% of previous users changed their FOV in response to the flare image 406, then the computing device may determine flare image 406 to be the top-ranked stimulus object of the available stimulus objects for a set of video frames. The historical FOV change data may also include statistical information for previous changes to FOVs that can be used to predict the direction and speed of a change to an FOV. For example, the computing device may calculate the direction and speed of the previous changes to FOVs by one or more user. The computing device may also calculate the average direction and the average speed of those changes to the FOVs. In addition, the computing device may calculate various statistical values such as the standard deviation of the direction and the standard deviation of the speed which may be used to predict changes to an FOV.

Figure 9:
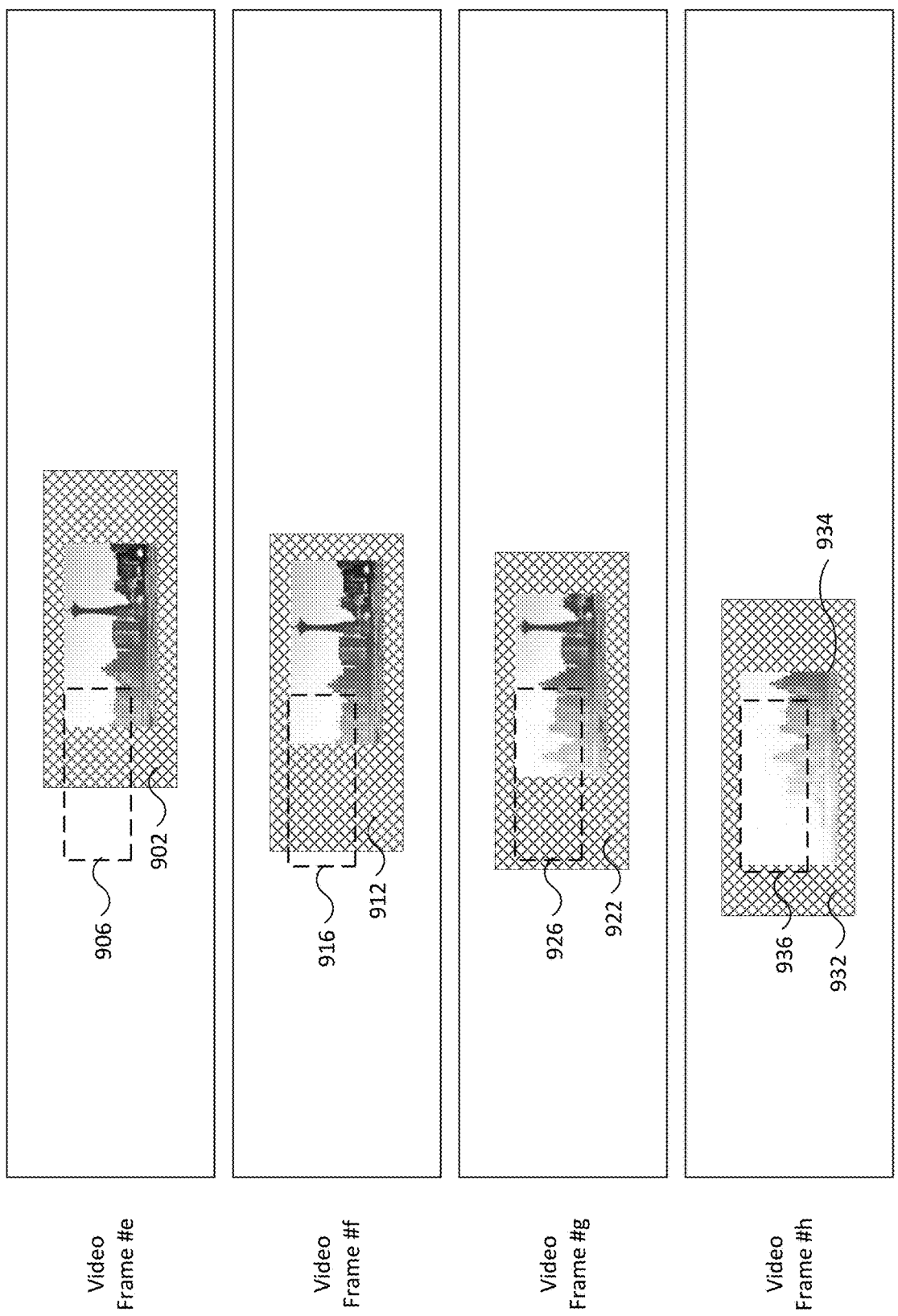
FIG. 9 and FIG. 10 show examples of transmission regions and display regions in immersive video frames.

In FIG. 9, a set of video frames # e, # f, # g, and # h is shown for immersive video content having audio data in which a narrator discusses the sunset depicted in the immersive video content. The computing device may determine the audio data is an audio stimulus object for this immersive video content and predict that those portions 906, 916, 926, and 936 of the respective video frames # e, # f, # g, and # h that depict the sunset are visual stimulus objects. The computing device may thus predict that the user will move the FOV toward those portions 906, 916, 926, and 936. As shown in FIG. 9, the computing device has determined transmission regions 922 and 932 such that they include the portions 926 and 936 of the respective video frames # g and # h that depict the sunset. As also shown in FIG. 9, the user has moved the FOV leftward to view the portion 936 of video frame # h that depicts the sunset which has, in turn, shifted the location of the display region 934 also to the left.

In step 535 (FIG. 5), the computing device may determine the transmission regions (e.g., location, size, etc.) of the set of video frames based on the prediction of step 530. The transmission regions determined for each video frame of a set of video frames may have the same size and the same location relative to the total area of the video frames. As described above, however, the computing device may adjust the transmission regions (e.g., size, location, etc.) determined for the video frames of subsequent sets of video frames based on indications of changes to the FOV. In step 536, the computing device may send the transmission regions to the user device. The user device may determine display regions from the received transmission regions and sequentially display the determined display regions during playback of the immersive video content.

In step 540, the computing device may determine whether an indication of a change to the FOV has been received from the user device. During playback of the immersive video content, the user device may send indications of changes to the FOV, e.g., when the user moves the FOV in response to one or more stimulus objects associated with the set of video frames. If the computing device receives an indication of a change to the FOV from the user device, then the computing device may determine whether the indicated change to the FOV matches the predicted change to the FOV in step 545.

If the computing device determines the indicated change matches the predicted change, then in step 550, the computing device may provide updated display region information to be stored as historical FOV change data. The updated display region information may be, for example, a reference point of the updated display region for an immersive video frame. In step 555, the computing device may update the historical FOV change data by indicating the predicted FOV change matched the actual FOV change. For example, the computing device may update the stimulus strength of a stimulus object which may cause the computing device to give that stimulus object greater weight when predicting subsequent changes to an FOV.

If additional sets of video frames are available, then step 520 may be repeated after the step 555. Although FIG. 5 shows that the step 520 is repeated after the step 555, this may not be the case in other examples. For example, as soon as the computing device receives the subsequent set of video frames (or a portion of the subsequent set of video frames), steps 520, 530, and 535 may be performed for the subsequent set of video frames while steps 520, 530, 535, 540, 545, 550, or 555 are performed for the current set of video frames.

If, in step 545, the computing device determines that the indication of the change to the FOV does not match the predicted change to the FOV, then in step 560, the computing device may adjust the transmission regions (e.g., size, location, etc.) of the current set of video frames based on the FOV indication of the change to the FOV. The adjusted transmission regions may include changed display regions corresponding to the changed FOV.

Figure 6:
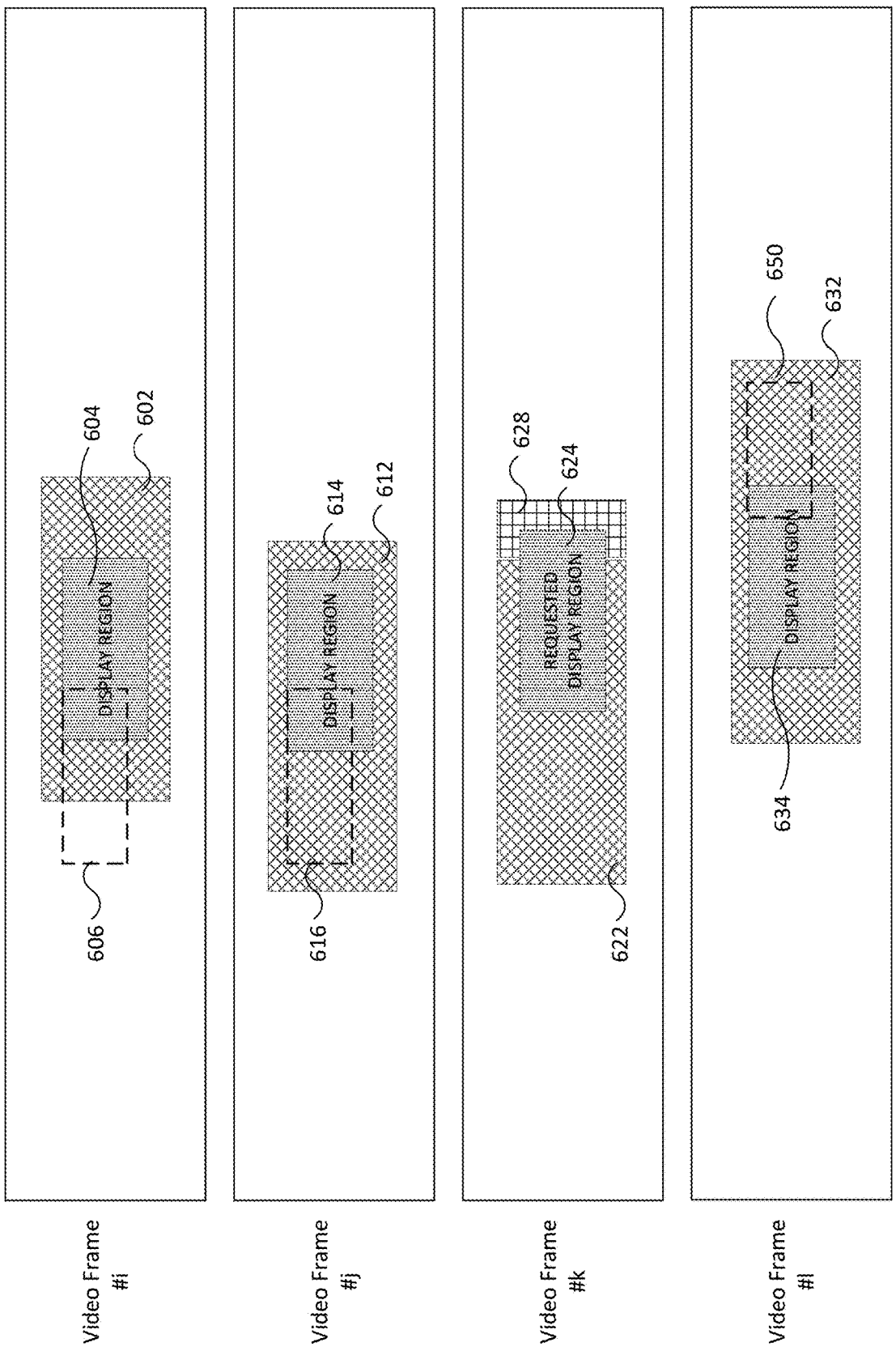
FIG. 6 shows an example of an inaccurate prediction of an FOV change request in determining transmission regions of immersive video frames.

FIG. 6 shows an example of an incorrect prediction of a change to an FOV when determining transmission regions of immersive video frames. In video frames # i and # j of FIG. 6, the computing device may identify one or more stimulus objects in regions 606 and 616. Based on the identified stimulus objects, the computing device may determine the transmission region 612 for the video frame # j by adjusting the size and/or location of the transmission region 602. A reference point of a transmission region (or a display region) may be used to indicate the location of the transmission region (or the display region). For example, the top-left corner of the transmission region 602 may be the reference point of the display region 602 in the video frame # i, and the top-left corner of the transmission region 612 may be the reference point of the display region 612 in the video frame # j. Alternatively or additionally, other points, e.g., the center of a transmission region, may be used as a reference point. The transmission region 612 may be adjusted to include both the region 616 associated with the one or more stimulus objects and the display region 614.

In response to an indication of a change to the FOV associated with the video frame # k, the requested display region 624 may be determined. The indication of the change to the FOV associated with the video frame # k may be generated before displaying the video frame # k. Because the direction of the change to the FOV does not match the direction of the predicted change to the FOV, and because the received transmission region 622 does not include the entirety of the requested display region 624, there may be a slight delay before the requested display region 624 is displayed. In an example, the additional region 628 of the video frame # k may be transmitted to the user device (e.g., the IV device 118 in FIG. 1) from the computing device as soon as the computing device receives the indication of the change to the FOV. In another example, the corresponding region of the transmission region 602 in the video frame # i may be used as the additional region 628 and merged to the transmission region 622 such that the requested display region 624 can be displayed with minimal to no delay. Some key video frames (e.g., I-frames) or some forward-predicted frames (e.g., P-frames) may have relatively bigger transmission regions. The transmission regions of I-frames or P-frames with temporal proximity may be used to reconstruct the additional region 628 of video frame # k. Various video/image coding methods may be used to smooth the boundaries between the transmission region 624 and the corresponding region of the transmission region 602 when it is merged to the transmission region 622.

The computing device may adjust one or more transmission regions for video frames following video frame # k based on the indication of the change to the FOV received. The computing device may predict a subsequent change to the FOV based on that indication as described above, e.g., using parameters associated with bodily movements such as acceleration, velocity, and/or inertia. In video frame # l, the transmission region 632 has been adjusted to include the changed display region 634. The transmission region 632 for video frame # l may be determined based on a prediction that the display region 634 will move from the location of the requested display region 624 for video frame # k. The region 650 of video frame # l may include a newly identified stimulus object or the region 650 may be determined based on the actual change to the FOV.

In FIG. 5, the computing device may update historical FOV change data, in step 555, based on the indication of the change to the FOV change request. Since the computing device, in this example, adjusts the transmission region (step 560) after determining that the indication of the change to the FOV did not match the predicted change to the FOV (step 545), the update to the historical user change data may represent negative feedback which can also be useful when making subsequent predictions of changes to the FOV. For example, the stimulus strengths of stimulus objects may be based on the negative feedback. If additional sets of video frames are available, then step 520 may be repeated after step 555 as noted above.

If the computing device does not receive an indication of a change to the FOV in step 540, then the computing device may similarly update the historical FOV change data in step 555. The lack of an indication of a change to the FOV may also represent negative feedback that can be useful when subsequently predicting changes to the FOV. For example, the computing device may decrease the stimulus strengths of stimulus objects or may update the historical FOV change data to indicate that a change to the FOV change is less likely to occur during playback of one or more video frames. Further, this negative feedback may be used to adjust the transmission regions of one or more video frames. The adjusted transmission regions may include the unchanged (or minimally changed) display regions. In addition, the computing device may determine that fewer changes from the locations and/or sizes of the transmission regions of previous video frames are needed. If transmission regions are relatively static, then video coding efficiency may increase because the same transmission regions in adjacent video frames have similar image content.

If a stimulus object or historical FOV change data is not available in step 525, then in step 565 the computing device may determine whether an indication of a change to the FOV has been received. If so, then in step 570 the computing device may adjust the transmission regions for a subsequent set of video frames (e.g., location, size, etc.) based on the received indication. The adjusted transmission regions may include a changed display region corresponding to the changed FOV.

Figure 7:
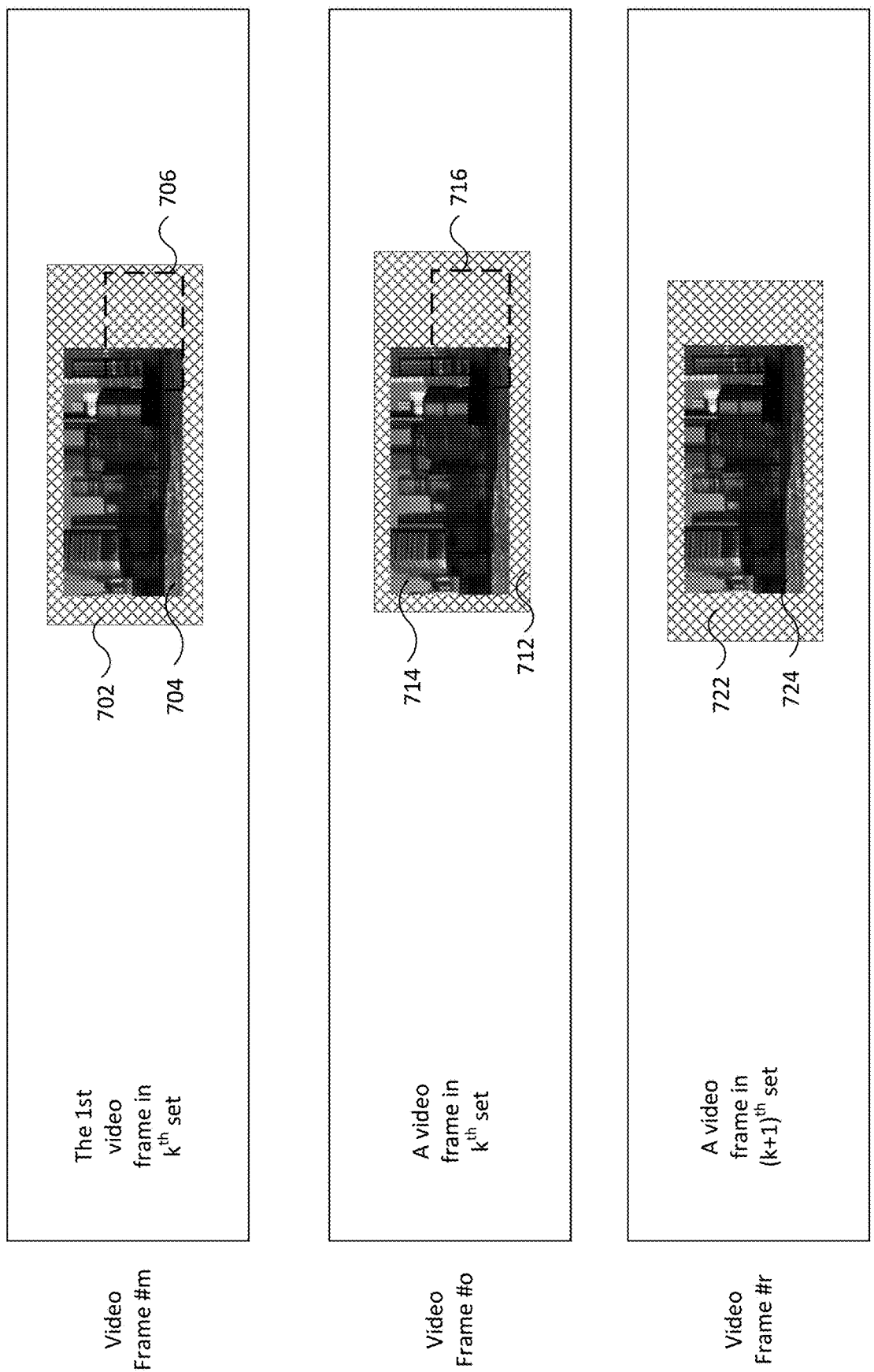
FIG. 7 shows another example of an inaccurate prediction of an FOV change request in determining transmission regions of immersive video frames.

FIG. 7 shows another example of an inaccurate prediction of an FOV change request when determining the transmission regions of immersive video frames. As shown in FIG. 7, the computing device may determine an image of a flare in the display region 704 as a relatively strong stimulus object and adjust transmission regions (including the transmission region 712) of the video frames in the $k^{th}$ set. The flare image 706 may be determined as a main stimulus object associated with the video frame # m. Based on the prediction of the direction and the speed of the change to the FOV, the computing device may thus predict that the user will move the FOV toward the flare image 706 and adjust the transmission region based on this prediction. The transmission region 712 may be adjusted based on the size and location of the transmission region 702. The transmission regions determined may include all portions of the display region corresponding to the current FOV. For example, the adjusted transmission region 712 includes the display region 714, which has the same location as the display region 704. Contrary to the predicted change to the FOV, however, as shown in FIG. 7, the user may maintain the current FOV during playback of the video frames # m, # o, and # r. The computing device may thus determine the transmission region 722 such that it includes the unchanged display region 724 near the center of the transmission region 722 for a subsequent set of video frames (e.g., the video frame # r in $(k+1)^{th}$ set). In the example of FIG. 7, the display region 724 in the video frame # r has not been changed while the user viewed the display region 714 of the video frame # o. The adjusted transmission region 722 may be determined and sent to the user device (e.g., the IV device 118 in FIG. 1) based on indications of actual changes to the FOV. Then, historical FOV change data may be updated, in step 555, based on the non-reception of an FOV change request. If the analysis engine predicted an FOV change, a negative feedback may be provided to the FOV change analysis engine. If the analysis engine predicted no FOV change, a positive feedback may be provided to the FOV change analysis engine. Weights of stimulus objects may also be calibrated and the calibrated weights may be used in prioritizing and weighting the same or similar stimulus objects in subsequent analyses. If a subsequent set of video frames exists, the step 520 is performed after the step 555. Although FIG. 5 shows that the step 520 is repeated after the step 555, this may not be the case in other examples.

Figure 8:
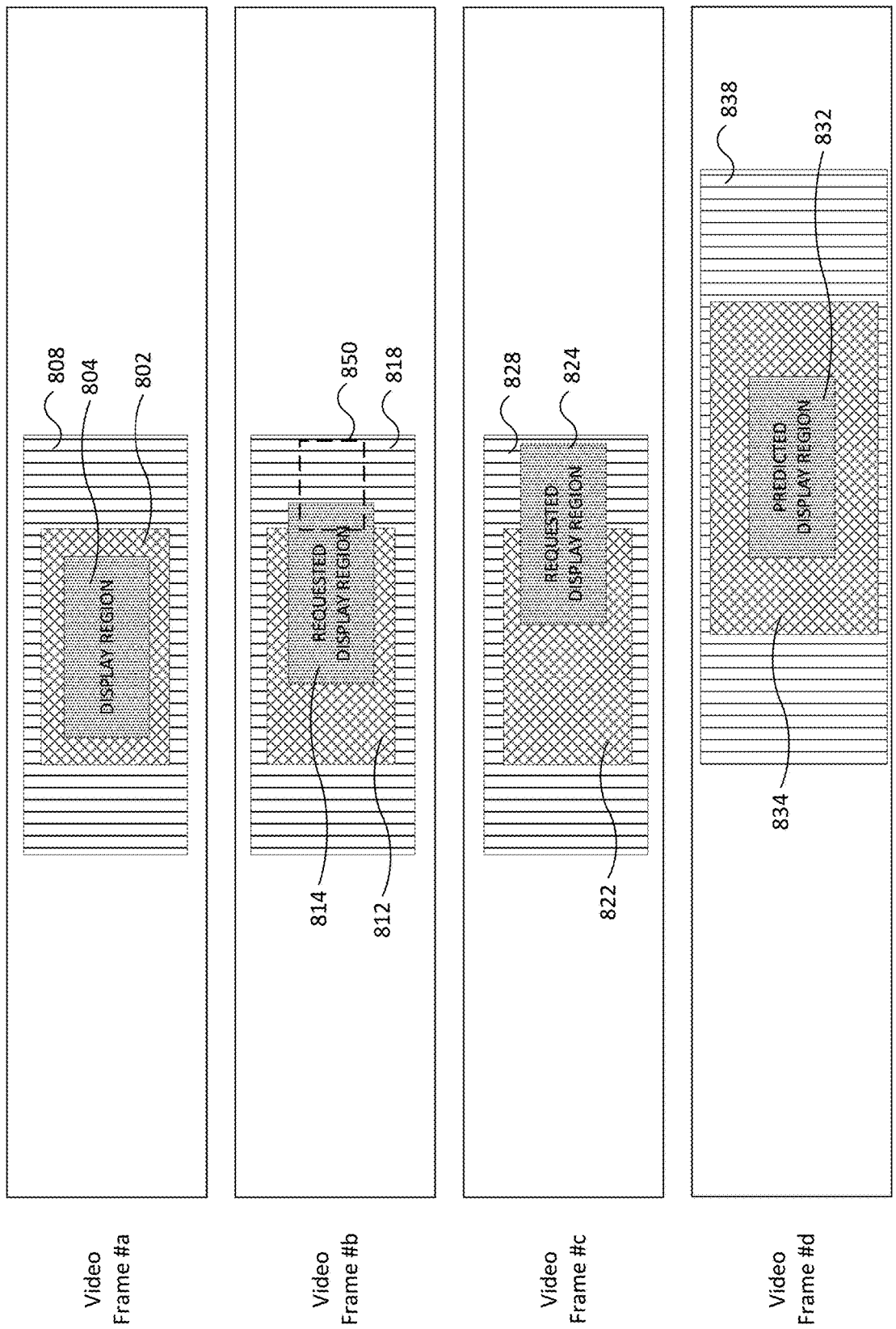
FIG. 8 shows another example of an inaccurate prediction of an FOV change request in determining transmission regions of immersive video frames.

FIG. 8 shows another example of an inaccurate prediction of an FOV change request in determining transmission regions of immersive video frames. The computing device may predict that the user does not change the FOV in video frames # a, # b, # c and other video frames between the video frame # a and the video frame # c. Based on the prediction, the computing device may send transmission region 802 of the video frame # a, transmission region 812 of the video frame # b, and transmission region 822 of the video frame # c. Additional regions 808, 818, 828 may be created based on the corresponding regions of one or more key video frames, e.g., an I-frame preceding the video frame # a. The computing device may set the whole region of a key video frame (or a substantially larger region than the size of a transmission region of a non-key video frame) to be the transmission region of the key video frame. Thus, the user device (e.g., the IV device 118 in FIG. 1) may receive a relatively larger transmission region with respect to a key video frame in comparison with transmission regions of other non-key video frames. As shown in FIG. 8, the additional regions 808, 818, 828 may be smoothly merged to the transmission regions 802, 812, 822, respectively.

The user may change the FOV to display the requested display region 814 during playback of video frame # b. If the computing device, in this example, did not identify a stimulus object in the video frame # b or identify any useful historical FOV change data, then the received transmission region 812 might not include the entire portion of the requested display region 814. If possible to do so without significant latency associated with transmission time and/or decoding time, the computing device may send an additional transmission region 818 of the video frame # b for display during playback the video frame # b. If, however, the time to transmit and decode the additional transmission region 818 of the video frame # b would result in an appreciable delay (and possibly diminish the user experience) the additional region 818 may be pre-merged to the transmission region 812. Pre-merging the additional region 818 to the transmission region 812 may permit display, with minimal to no latency, those portions of the requested display region 814 that may not be included in the transmission region 812. Similarly, some portions of the requested display region 824 of the video frame # c may be covered by the additional transmission region 828. The merger of the additional transmission region 818 and the transmission region 812 may be performed as described above with respect to FIG. 6.

For some video frames such as video frame # d, the computing device may adjust (e.g., size, location, etc.) and send the transmission region 834 based on a received indication of a change to the FOV. If the prediction accuracy decreases and the probability that the FOV will change increases, then the computing device may increase the size of the transmission region 834 as shown by way of example in FIG. 8. Further, the computing device may also increase the size of the additional transmission region 838. The computing device may determine the location of the transmission region 834 based on the location of predicted display region 832. The computing device may transmit the entire portions of the video frame # d to serve as an additional key video frame due to an incorrect prediction of a change to the FOV, a decreased prediction accuracy, and/or an increased probability that the FOV will change.

FIG. 10 shows an example of transmission regions and display regions in an immersive video. The video frames, in this example, depict a football kickoff between a kicking team and the receiving team. In video frame # s, the current FOV corresponds to the display region 611 which depicts the ball and the kicking team. The user device, in this example, may have already received the transmission regions of a set of video frames that includes the transmission region 610. The surrounding region 612 may be a region included in the transmission region 610 and surrounds the display region 611. The surrounding region 612 thus serves as a buffer region to provide at least some portion of the video frame # s in response to changes to the FOV at that region of the video frame # s.

As shown in video frame # s+k of FIG. 10, there may be multiple players on the receiving team that could potentially receive the ball after the kickoff. The computing device may thus determine with a relatively high probability that the user will change the FOV to view one of the players that could potentially receive the kickoff during playback of the video frame # s+k. But the computing device might not be able to predict with a threshold level of accuracy which particular player the user will change the FOV to view. The players of the receiving team in the video frame # s+k may thus represent competing stimulus objects 666 and 668 in proximity to the display region 661. The computing device may thus adjust the size of the transmission region 660 such that it includes the display region 661 as well as the stimulus objects 666 and 668. In this way, the user device may be prepared to display that portion of the video frame # s+k should the user shift the FOV to one of the stimulus objects 666 or 668 during playback.

Figure 11:
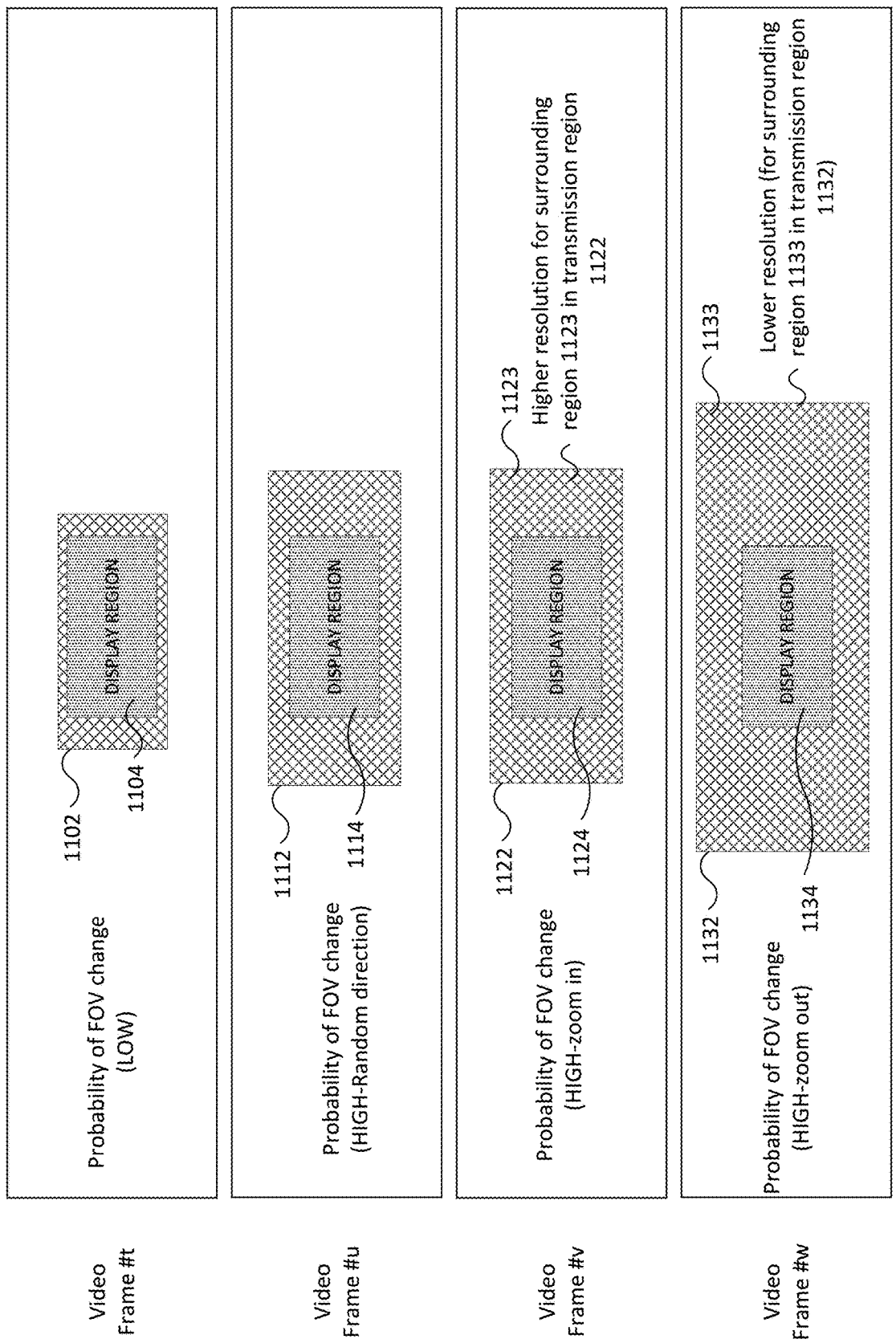
FIG. 11 shows an example of transmission regions and display regions in immersive video frames for a predicted zooming operation.

FIG. 11 shows an example of transmission regions and display regions in immersive video frames for a predicted zooming operation. The computing device, in this example, may determine that the probability of a change to the FOV during playback of the video frame # t is relatively low. Accordingly, the computing device may determine the transmission region 1102 such that its size is relatively small or not much larger than the display region 1104. Further, the computing device, in this example, may determine that the probability of a change to the FOV during playback of the video frame # u is relatively high. Accordingly, the computing device may determine the transmission region 1112 such that its size is relatively large compared to the display region 1114.

With respect to video frame # v, the computing device, in this example, may predict that the user will zoom-in at the FOV and/or may receive an indication that the user has zoomed-in at the FOV. In response, the computing device may enlarge the size of a portion of the transmission region 1122 for display at the display region 1124. The enlarged portion of the transmission region 1122 may have a higher resolution as compared to the same portion of the transmission region 1122 when not enlarged. The computing device may adjust the transmission region 1122 of the video frame # v such that the surrounding region 1123 around the display region 1124 also has the higher resolution. In other examples, only the enlarged portion of the transmission region 1122 may have the higher resolution.

With respect to video frame # w, the computing device, in this example, may predict that the user will zoom-out at the FOV and/or may receive an indication that the user has zoomed-out at the FOV. In response, the computing device may reduce the size of a portion of the transmission region 1132 for display at the display region 1124. The reduced portion of the transmission region 1132 may have a lower resolution as compared to the same portion of the transmission region 1132 when not reduced. The computing device may adjust the transmission region 1132 of the video frame # w such that the surrounding region 1133 around the display region 1134 has a relatively lower resolution while the display region 1134 has a relatively higher resolution. In this way, the display region 1134 may be displayed with the relatively higher resolution in the event the user does not actually zoom-out as predicted. In other words, the computing device may send, based on the prediction that the user will zoom-out at the FOV, the transmission region 1132 with a relatively lower resolution for only the surrounding region 1133 with the relatively higher resolution of the display region 1134 unchanged. In other examples, the computing device may determine the transmission region 1132 such that both the display region 1134 and the surrounding region 1133 have a relatively lower resolution.

Figure 12:
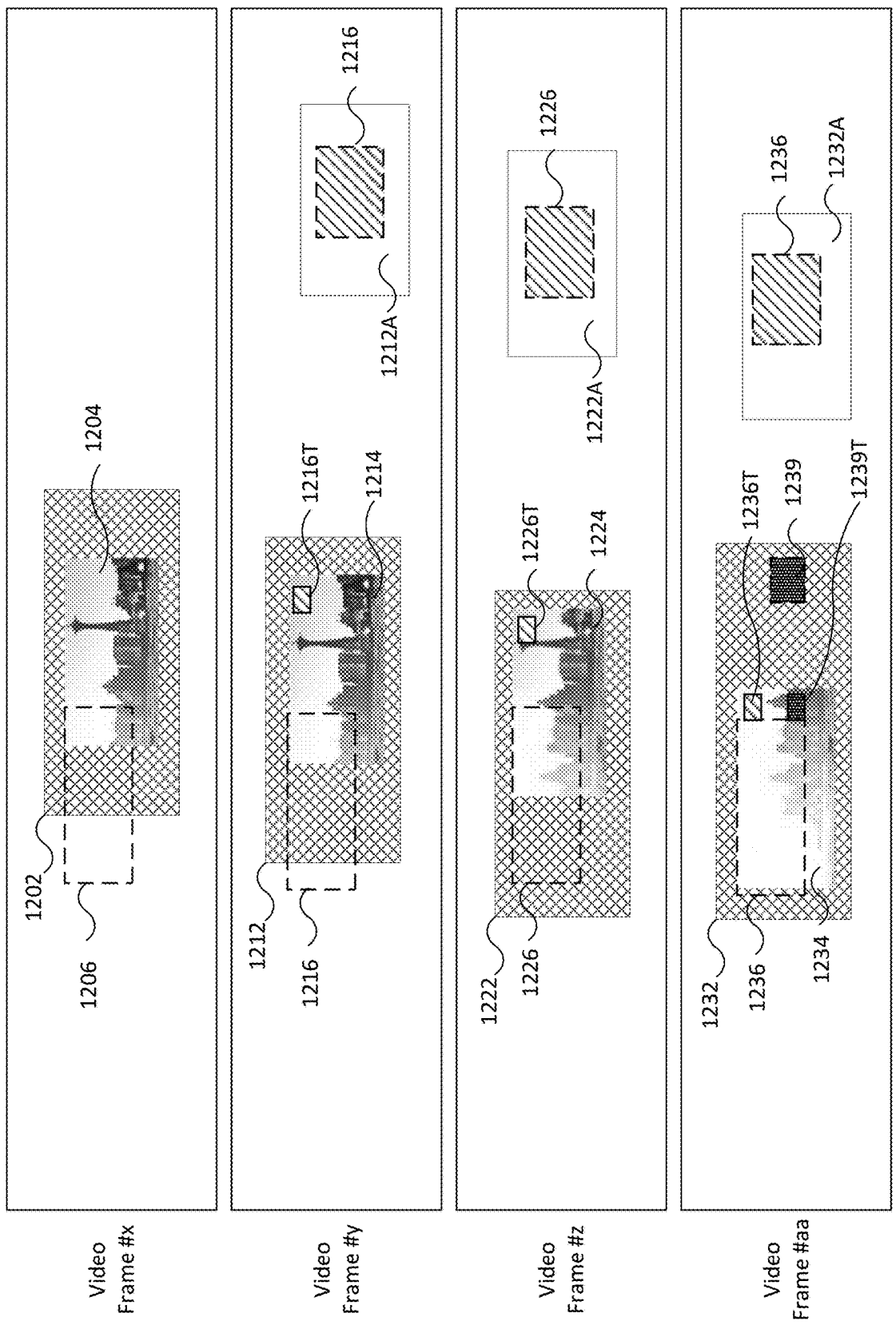
FIG. 12 shows an example of transmission regions and display regions in immersive video frames having a stimulus object located outside of the display regions.

FIG. 12 shows an example of transmission regions and display regions in immersive video frames having a stimulus object located outside of the display regions. Similar to FIG. 9, stimulus object 1206, 1216, 1226, and 1236 respectively associated with the video frames # x, # y, # z, and # aa may be identified by the computing device. The computing device may also identify other stimulus objects associated with at least one of the video frames # x, # y, # z, and # aa. The current FOV may correspond to display region 1204 included in the transmission region 1202 of the video frame # x.

As discussed above, the computing device may identify the first stimulus object 1206, 1216, 1226, and 1236 associated with the video frames # x, # y, # z, and # aa. Based on the identified stimulus object 1206, 1216, 1226, and 1236 and/or historical FOV change data associated with the video frames # x, # y, # z, and # aa, the computing device may determine transmission regions 1202, 1212, 1222, and 1232. Further, the computing device may identify second stimulus objects 1216, 1226, and 1236 associated with the video frames # y, # z, and # aa, and third stimulus object 1239 associated with the video frame # aa. The computing device may determine additional transmission regions 1212A, 1222A, 1232A based on the additional stimulus objects 1216, 1226, and 1236 identified. The computing device may adjust the transmission region 1232 based on the third stimulus object 1239 located in proximity to the display region 1234 by enlarging the size of the transmission region 1232. For example, if the distance between the center of the third stimulus object 1239 and the center of the display region 1234 does not meet a proximity threshold, the computing device may determine that the third stimulus objet 1239 is located in proximity to the display region 1234. In an example, the proximity threshold may be 1.5 times the longer side of the display region 1234. In some examples, the proximity threshold may be determined from a range of about one half of the shorter side of the display region 1234 to about 2 times the longer side of the display region 1234. The computing device may choose to expand a transmission region or to add an additional transmission region based on the proximity threshold.

The computing device may send thumbnail control information to the user device (e.g., the IV device 118 of FIG. 1). The user device may display a thumbnail image corresponding to a stimulus object that is not included in a display region. The user device may store a setting that indicates whether to display the thumbnail image. For example, the computing device may transmit, to the user device, the additional transmission region 1212A associated with the video frame # y, which includes the additional stimulus object 1216. The thumbnail image 1216T may be displayed in the display region 1214 during playback of video frame # y. The thumbnail image 1216T may visually inform the user that the second stimulus object 1216 is available to be viewed. The user may select the thumbnail 1216T to change the FOV and view the additional stimulus object 1216, 1226, or 1236 during playback of video frames # y, # z, and/or # aa, respectively. For example, in response to a selection of the thumbnail image 1216T, the display region 1214 may be changed to a new display region included in the additional transmission region 1212A. The new display region may or may not be contiguous with the previous display region. In other words, the display region 1214 may be replaced with a new display region included in the additional transmission region 1212A. Similarly, in response to a selection of the thumbnail image 1216T, the display region 1224 may be changed to a new display region included in the additional transmission region 1222A, and the display region 1234 may be changed to a new display region included in the additional transmission region 1232A. If the user selects the thumbnail image 1226T displayed in the display region 1224, then the display region 1224 (or other display regions following the display region 1224) may be changed as discussed above with respect to the selection of the thumbnail image 1216T. Thumbnails images associated with a stimulus object not located in proximity to the current display region (e.g., the thumbnail images 1216T, 1226T, 1236T) may be displayed on a predetermined location of the current display region (e.g., the top row of the current display region as shown in FIG. 12). In some examples, the thumbnail images 1216T, 1226T, 1236T may be displayed in association with the direction of the additional stimulus objects 1216, 1226, 1236. For example, the additional stimulus objects 1216, 1226, and 1236 are each located to the right of the display regions 1214, 1224, and 1234 in video frames # y, # z, and # aa, respectively. Accordingly, the thumbnail images 1216T, 1226T, and 1236T may be displayed on the right side of those display regions as shown by way of example in FIG. 12 to inform the user of which direction to move the FOV in order to view the additional stimulus objects. In other examples, thumbnail images may be displayed on the top/bottom and/or left/right of a display region depending on where the additional stimulus object is located in the video frame relative to the display region.

The computing device may analyze the movement of the additional stimulus objects between the respective video frames # y, # z, and # aa. The computing device may use the movement of a stimulus object across a sequence of video frames to determine an additional transmission region to send to the user device. As shown in FIG. 12, the additional stimulus objects 1216, 1226, and 1236 move to the left during playback of the video frames # y, # z, and # aa. Accordingly, the computing device may adjust the locations of the additional transmission regions 1212A, 1222A, 1232A based on that movement of the additional stimulus objects 1216, 1226, 1236 across those video frames.

The computing device may enlarge a transmission region to include an additional stimulus object. As shown in FIG. 12, for example, the computing device has enlarged the transmission region 1232 to include the additional stimulus object 1239 in video frame # aa. An additional thumbnail image 1239T may be displayed in the display region 1234 to visually inform the user that the additional stimulus object 1239 is available to be viewed. As described above, the thumbnail image 1239T may be displayed in the display region 1234 in accordance with the direction of the additional stimulus object 1239 relative to the display region 1234.

Figure 13:
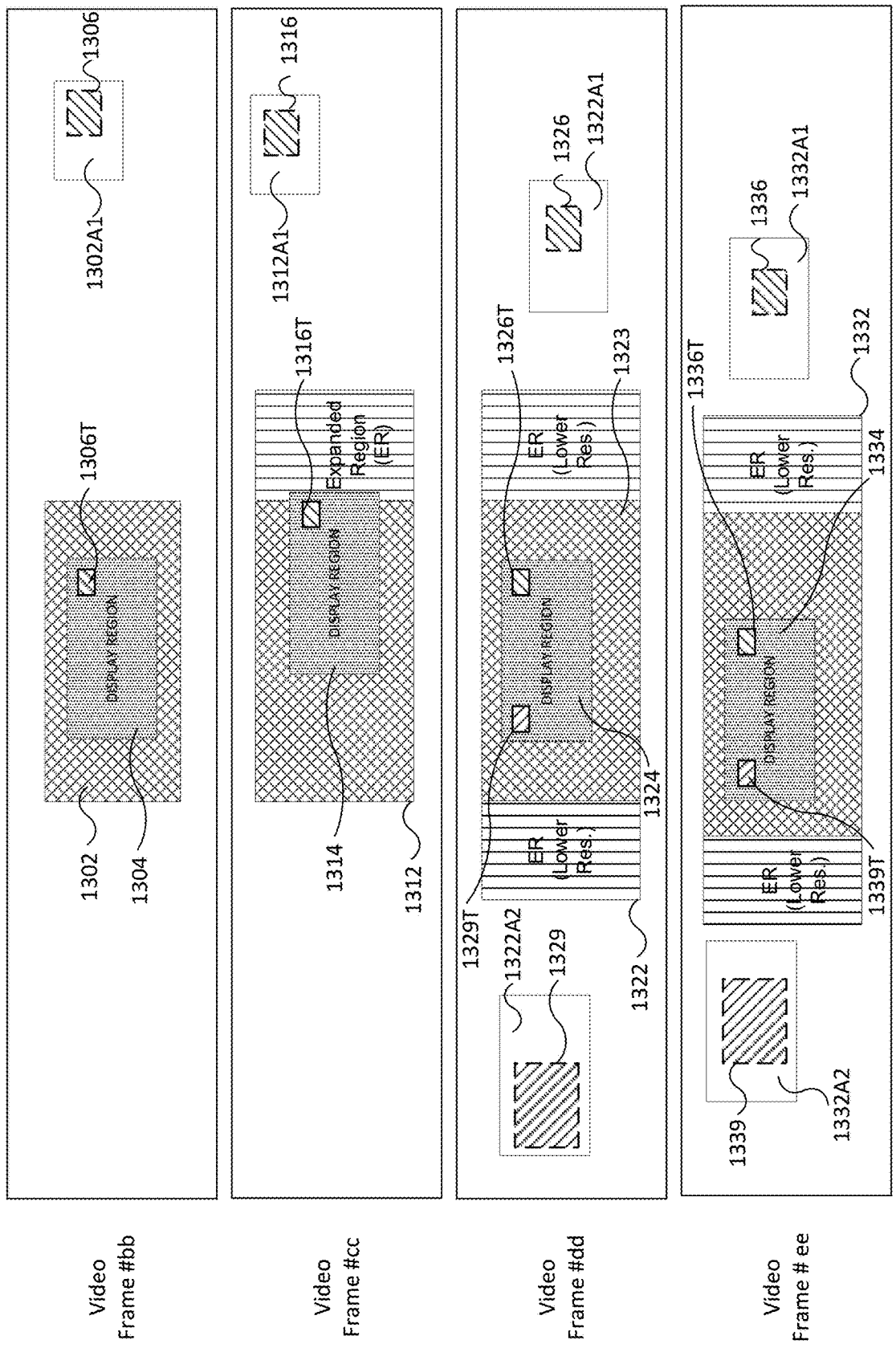
FIG. 13 shows an example of transmission regions and display regions in immersive video frames having a plurality of stimulus objects.

FIG. 13 shows an example of transmission regions and display regions in immersive video frames having multiple stimulus objects. The computing device may analyze the video frames # bb, # cc, # dd, and # ee to determine transmission regions 1302, 1312, 1322, and 1332. As discussed above, the computing device may identify one or more stimulus objects and/or historical FOV change data to predict an FOV change. For example, stimulus objects 1306, 1316, 1326, and 1336 and stimulus objects 1329, and 1339 may be identified by the computing device. Based on the identification of the stimulus objects 1306, 1316, 1326, and 1336, the computing device may determine additional transmission region 1302A1 for video frame # bb, additional transmission region 1312A1 for video frame # cc, additional transmission region 1322A1 for video frame # dd, and additional transmission region 1332A1 for video frame # ee. Based on the identification of the stimulus objects 1329 and 1339, the computing device may determine additional transmission region 1322A2 for video frame # dd and additional transmission region 1332A2 for video frame # ee. The computing device may also send thumbnail control information to the user device in order to display thumbnail images 1306T, 1316T, 1326T, 1329T, 1336T, 1339T in the corresponding display regions 1304, 1314, 1324, and 1334 as shown in FIG. 13.

The computing device may enlarge the transmission region 1312 based on the identification of the stimulus objects 1306, 1316, 1326, and 1336 if the user moves (or is predicted to move) the FOV to the right in order to view those stimulus objects. In video frames # dd and # ee, however, the stimulus objects 1326 and 1336 are located in the opposite direction of the stimulus objects 1329 and 1339 relative to the display regions 1324 and 1334. The opportunity to view two different stimulus objects may reduce the respective probabilities that the user will change the FOV to view either one of those stimulus objects. The computing device may thus calculate the stimulus strength of those competing stimulus objects and may adjust a transmission region by expanding the transmission region and reducing the resolution of the expanded region (ER). For example, the ERs located on the left and right sides of the transmission region 1322 may have a resolution that is, e.g., 50% of the resolution than the resolution of the central portion 1323 of the transmission region 1322 that includes the display region 1334. The resolution may be lower or higher than the 50% and the extent to which the computing device adjusts the resolution may depend on various factors, such as communication resources, Quality of Service (QoS) requirement settings, etc.

The size of a transmission region may increase in proportion to a probability a user will change the FOV. Further, the resolution of at least some portions of a transmission region may be changed based on the probability a user will change the FOV. For example, as the probability FOV increases, the resolution of at least some portions of a transmission region may decrease. If the speed of the change to the FOV predicted to be relatively high, then the resolution of the determined transmission region may be relatively lower, and the size of the determined transmission region may be relatively larger. The computing device may predict changes to the FOV based on patterns observed with respect to the speed and/or acceleration of changes to the FOV by one or more users.

A user may change the FOV in various ways. For example, a user may change the FOV gradually or discretely. For example, the user may gradually change the FOV by rotating his/her head while wearing a head-mounted display device. The user may discretely change the FOV by selecting a thumbnail image (as discussed above with reference to FIG. 12) in order to replace the current display region with the display region corresponding to the thumbnail image. The user may also discretely change the FOV by selecting another perspective (as described above with reference to Table 1).

Stimulating force may be different for each stimulus object. For example, the stimulating force may be determined based on the magnitude of impact, location of the stimulus object with respect to the current FOV and/or distance of the stimulus object with respect to the current FOV. For example, a visual object included in a sequence of video frames moving faster may have greater stimulating force than a slowly moving object. The velocity of a visual object, the degree of color change of a visual object, a size change of a visual object may be considered in determining the magnitude of impact. For other stimulus objects, such as audible data or tactile data, loud sound and strong tactile stimulus may have greater magnitude of impact. If a stimulus object is included in the current display region or closely located to the display region, the stimulus object may have greater weight or influence. The location of the stimulus object may also affect the weight or influence degree of the stimulus object (e.g., whether stimulus object is included in the display region or surrounding region). The distance of the stimulus object from the current vantage point may also affect the weight or influence degree of the stimulus object (e.g., the greater the distance, the smaller the weight or influence).

An advertisement item in an immersive media stream may be placed based on the prediction of an FOV change. For example, an advertisement item or product placement may be included in predicted future display regions corresponding to the predicted FOV changes.

Figure 14:
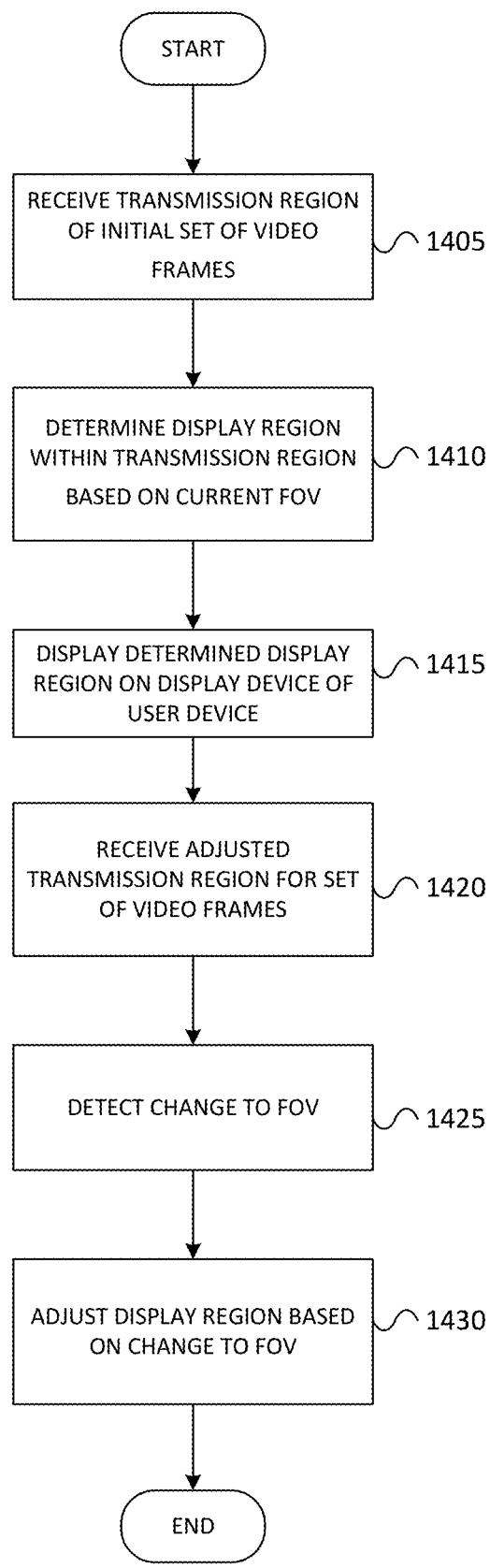
FIG. 14 is a flowchart of example method steps for adjusting a display region.

FIG. 14 shows a flowchart of example method steps for adjusting a display region. For example, a user device (e.g., the IV device 118 of FIG. 1), may perform the example method steps of FIG. 14. In step 1405, the user device may receive transmission regions of an initial set of video frames. In step 1410, the user device may determine one or more display regions within the received transmission regions based on the current FOV of the user device. In step 1415, the user device may display the determined display regions on a display device of the user device. In step 1420, the user device may receive adjusted transmission regions for a set of video frames. The adjusted transmission regions may be determined based on a predicted change to the FOV. In step 1425, the user device may detect a change to the FOV. In step 1430, the user device may adjust the display regions based on the predicted change to the FOV.

Figure 15:
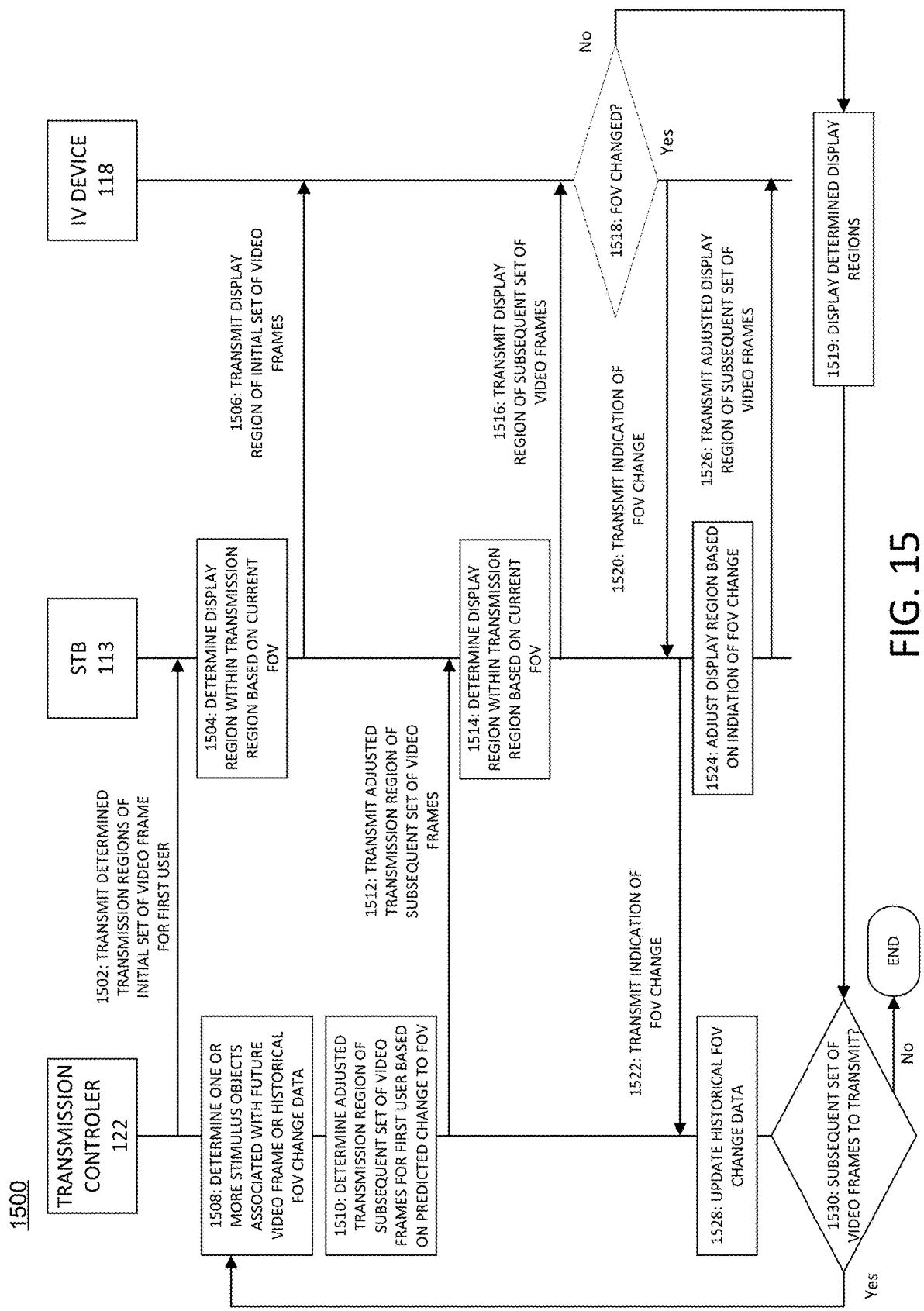
FIG. 15 shows another example of a message flow diagram for determining transmission regions and display regions.

FIG. 15 shows another example of a message flow diagram for determining transmission regions and display regions. A system may include the transmission controller 122, the set-top box (STB) 113, and an IV device 118. Although only one IV device 118 is shown in FIG. 15, the STB 113 may output to multiple IV devices 118 in some examples.

The transmission controller 122 may provide IV content to the IV device 118. As shown in the example of FIG. 15, communication between the transmission controller 122 and the IV device 118 may be performed via the STB 113. The transmission controller 122 may determine a specific item of IV content to be provided to the IV device 118. The IV content may include a plurality of immersive video frames. The IV content may also include immersive audio data and other IV data associated with the IV video content. The transmission controller 122 may determine an initial set of video frames to transmit to the IV device 118. In step 1502, the transmission controller 122 may transmit determined transmission regions of the initial set of video frames to the STB 113. In step 1504, the STB 113 may determine display regions within transmission regions of the initial set of video frames received based on the current FOV of the IV device 118. In step 1506, the STB 113 may send the determined display regions of the initial set of video frames to the IV device 118. The IV device 118 may then display the determined display regions of the initial set of video frames in sequence during playback of the IV content.

In step 1508, the transmission controller 122 may determine one or more stimulus objects included in the subsequent set of video frames that follow the initial set of video frames and/or historical user FOV change data. As described above, the transmission controller 122 may predict the user will move the FOV to view one of the stimulus objects during playback of the subsequent set of video frames. In step 1510, the transmission controller 122 may adjust transmission regions of the subsequent set of video frames based on the stimulus objects identified and/or the historical FOV change data. In step 1512, the transmission controller 122 may transmit, to the STB 113, the adjusted transmission regions of the subsequent set of video frames. In step 1514, the STB 113 may determine display regions within the adjusted transmission regions based on the current FOV of the IV device 118. In step 1516, the STB 113 may transmit, to the IV device 118, the determined display regions.

In step 1518, the IV device 118 may determine whether a change to the FOV has been detected. If the IV device 118 does not detect a change to the FOV, then in step 1519 the IV device 118 may display the determined display regions. In step 1530, the transmission controller 122 may determine whether a subsequent set of video frames for the IV content is available. If so, then steps 1508, 1510, 1512, 1514, 1516, 1518, 1520, 1522, 1524, and 1526 may be repeated for the subsequent set of video frames. If a subsequent set of video frames is not available, e.g., if the immersive video content has finished playback, then the process may end.

If the IV device 118 detects a change to the FOV in the step 1518, then in step 1520 the IV device 118 may transmit an indication of the change to the FOV to the STB 113. In step 1522, the STB 113 may transmit the indication of the change to the FOV to the transmission controller 122. In this way, the transmission controller 122 may analyze user-initiated changes to the FOV associated with the transmitted video frames. In step 1524, the STB 113 may adjust display regions based on the indication of the change to the FOV received from the IV device 118. In step 1526, the STB 113 may transmit those adjusted display regions to the IV device 118.

In step 1528, the transmission controller 122 may update historical FOV change data as described above. The transmission controller 122 may perform step 1530 before or after the step 1528. When repeating the steps of 1508 and 1510 for a subsequent set of video frames, at least some of the updates processed in the step 1528 may be used to determine the transmission regions of the subsequent set of video frames. At least some of the updates processed in the step 1528 may be used to determine transmission regions for video frames transmitted to an IV device operated by another user.

Figure 16:
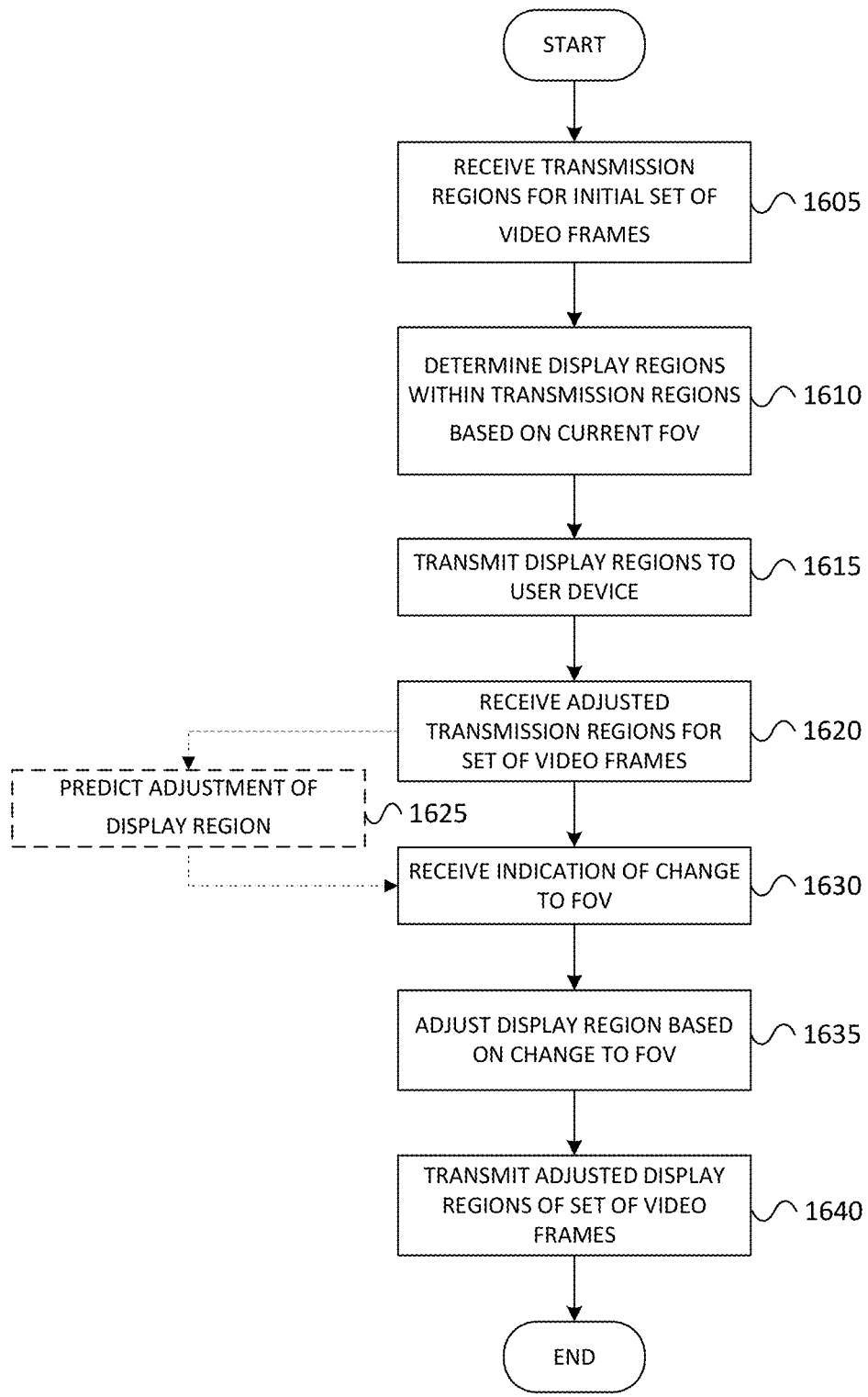
FIG. 16 is a flowchart of an example method for transmitting an adjusted display region.

FIG. 16 shows a flowchart of example method steps for transmitting an adjusting a display region. For example, an STB, e.g., the STB 113 shown in FIG. 15, may perform the example method steps of FIG. 16. In step 1605, the STB 113 may receive transmission regions of an initial set of video frames for a user device (e.g., the IV device 118 of FIG. 1). In step 1610, the STB 113 may determine display regions for the initial set of video frames. In step 1615, the STB 113 may transmit the determined display regions to the user device. In step 1620, the STB 113 may receive adjusted transmission regions of a set of video frames for the user. In step 1625, the STB 113 may predict an adjustment of display regions to be displayed on the user device. In step 1630, the STB 113 may receive an indication of a change to the FOV from the user device. In step 1635, the STB 113 may adjust display regions of the set of video frames based on the received indication of the change to the FOV. In step 1640, the STB 113 may transmit the adjusted display regions of the set of video frames to the user device.

Examples above relate to providing IV content to one or more IV devices. In other examples, however, the concepts discussed herein can be provided in any other type of computing device (e.g., a desktop computer, a server, a console, a set-top box, etc.). Although subject matter has been described in language specific to structural features and/or methodological acts, it is to be understood that the claims are not necessarily limited to the specific features or acts described above.

The invention claimed is:

1. A method comprising:
   determining, by a computing device, a display area of a user device displaying video content comprising a plurality of video frames;
   determining, based on one or more video frames of the plurality of video frames, a predicted change to the display area;
   determining, based on the predicted change to the display area, a subarea of an image area of an upcoming video frame of the plurality of video frames; and
   sending, to the user device, the subarea of the upcoming video frame.

2. The method of claim 1, wherein the subarea is greater than the display area and less than the image area of the upcoming video frame.

3. The method of claim 1, wherein determining the predicted change to the display area comprises determining a predicted direction of movement of the display area.

4. The method of claim 1, further comprising:
   determining, by the computing device, a visual object in the plurality of video frames,
   wherein the visual object is located outside of the display area, and
   wherein determining the subarea comprises extending an edge of the subarea toward the visual object.

5. The method of claim 4, wherein:
   the visual object comprises a probability value representing a probability that a field-of-view (FOV) will move toward the visual object during playback of the video content; and
   wherein extending the edge of the subarea toward the visual object comprises increasing a size of the subarea based on the probability value.

6. The method of claim 5, further comprising:
   receiving, by the computing device, an indication of whether the FOV moved toward the visual object during playback of the video content; and
   updating, by the computing device and based on the indication, the probability value.

7. The method of claim 1, further comprising:
   determining, by the computing device, an audio object associated with the plurality of video frames; and
   wherein determining the predicted change to the display area comprises determining the predicted change to the display area based on the audio object.

8. The method of claim 1, further comprising:
   determining, by the computing device, a delay associated with the predicted change; and
   wherein determining the subarea comprises determining a change of the subarea based on the delay.

9. An apparatus comprising:
   one or more processors;
   memory storing instructions that, when executed by the one or more processors, cause the apparatus to:
      determine a display area of a user device displaying video content comprising a plurality of video frames;
      determine, based on one or more video frames of the plurality of video frames, a predicted change to the display area;
      determine, based on the predicted change to the display area, a subarea of an image area of an upcoming video frame of the plurality of video frames; and send, to the user device, the subarea of the upcoming video frame.

10. The apparatus of claim 9, wherein the subarea is greater than the display area and less than the image area of the upcoming video frame.

11. The apparatus of claim 9, wherein the instructions, when executed by the one or more processors, cause the apparatus to determine the predicted change to the display area by determining a predicted direction of movement of the display area.

12. The apparatus of claim 9, wherein the instructions, when executed by the one or more processors, further cause the apparatus to:
 determine a visual object in the plurality of video frames, wherein the visual object is located outside of the display area, and
 determine the subarea of the image area of the upcoming video frame of the plurality of video frames by extending an edge of the subarea toward the visual object.

13. The apparatus of claim 12, wherein:
 the visual object comprises a probability value representing a probability that a field-of-view (FOV) will move toward the visual object during playback of the video content; and
 wherein the instructions, when executed by the one or more processors, cause the apparatus to determine the subarea by extending the edge of the subarea toward the visual object by increasing a size of the subarea based on the probability value.

14. The apparatus of claim 13, wherein the instructions, when executed by the one or more processors, further cause the apparatus to:
 receive an indication of whether the FOV has moved toward the visual object during playback of the video content; and
 update, based on the indication, the probability value.

15. The apparatus of claim 9, wherein the instructions, when executed by the one or more processors, further cause the apparatus to:
 determine an audio object associated with the plurality of video frames; and
 determine the predicted change to the display area by determining the predicted change to the display area based on the audio object.

16. The apparatus of claim 9, wherein the instructions, when executed by the one or more processors, further cause the apparatus to:
 determine a delay associated with the predicted change; and
 determine the subarea by determining a change of the subarea based on the delay.

17. A non-transitory computer-readable medium storing instructions that, when executed, cause:
 determining a display area of a user device displaying video content comprising a plurality of video frames;
 determining, based on one or more video frames of the plurality of video frames, a predicted change to the display area;
 determining, based on the predicted change to the display area, a subarea of an image area of an upcoming video frame of the plurality of video frames; and
 sending, to the user device, the subarea of the upcoming video frame.

18. The non-transitory computer-readable medium of claim 17, wherein the subarea is greater than the display area and less than the image area of the upcoming video frame.

19. The non-transitory computer-readable medium of claim 17, wherein determining the predicted change to the display area comprises determining a predicted direction of movement of the display area.

20. The non-transitory computer-readable medium of claim 17, wherein the instructions, when executed, further cause:
 determining a visual object in the plurality of video frames,
 wherein the visual object is located outside of the display area, and
 wherein determining the predicted change comprises extending an edge of the subarea toward the visual object.

21. The non-transitory computer-readable medium of claim 20, wherein:
 the visual object comprises a probability value representing a probability that a field-of-view (FOV) will move toward the visual object during playback of the video content; and
 wherein extending the edge of the subarea toward the visual object comprises increasing a size of the subarea based on the probability value.

22. The non-transitory computer-readable medium of claim 21, wherein the instructions, when executed, further cause:
 receiving an indication of whether the FOV moved toward the visual object during playback of the video content; and
 updating, based on the indication, the probability value.

23. The non-transitory computer-readable medium of claim 17, wherein the instructions, when executed, further cause:
 determining an audio object associated with the plurality of video frames; and
 wherein determining the predicted change to the display area comprises determining the predicted change to the display area based on the audio object.

24. The non-transitory computer-readable medium of claim 17, wherein the instructions, when executed, further cause:
 determining a delay associated with the predicted change,
 wherein determining the subarea comprises determining a change of the subarea based on the delay.

* * * * *

UNITED STATES PATENT AND TRADEMARK OFFICE
CERTIFICATE OF CORRECTION

PATENT NO. : 11,012,727 B2
APPLICATION NO. : 16/450333
DATED : May 18, 2021
INVENTOR(S) : Jeffrey Allen Hall et al.

It is certified that error appears in the above-identified patent and that said Letters Patent is hereby corrected as shown below:

In the Drawings

Sheet 15 of 16, Fig. 15, Reference Numeral 122:
Please delete "CONTROLER" and insert --CONTROLLER--

Sheet 15 of 16, Fig. 15, Reference Numeral 1524:
Delete "INDIATION" and insert --INDICATION--

In the Specification

Detailed Description, Column 14, Line 17:
Delete "406" and insert --404--

Detailed Description, Column 14, Line 36:
Delete "426." and insert --424.--

Detailed Description, Column 17, Line 32:
Delete "112." and insert --122.--

Detailed Description, Column 17, Line 33:
Delete "112" and insert --122--

Detailed Description, Column 28, Line 44:
Delete "602" and insert --604--

Detailed Description, Column 28, Line 46:
Delete "612" and insert --614--

Detailed Description, Column 29, Line 10:
Delete "624" and insert --622--

Signed and Sealed this
Fourteenth Day of March, 2023

Katherine Kelly Vidal
*Director of the United States Patent and Trademark Office*

Detailed Description, Column 33, Line 25:
Delete "objet" and insert --object--